(12) United States Patent
Sasidharan Pillai et al.

(10) Patent No.: US 12,459,971 B2
(45) Date of Patent: Nov. 4, 2025

(54) ALBUMIN RICH PEA PROTEIN ISOLATE AND PROCESS FOR PRODUCTION THEREOF

(71) Applicant: Louis Dreyfus Company Plant Proteins LLC, Livermore, CA (US)

(72) Inventors: Prasanth Kumar Sasidharan Pillai, Livermore, CA (US); Manoj Kumar, Livermore, CA (US)

(73) Assignee: Louis Dreyfus Company Plant Proteins LLP, Livermore, CA (US)

(*) Notice: Subject to any disclaimer, the term of this patent is extended or adjusted under 35 U.S.C. 154(b) by 0 days.

(21) Appl. No.: 19/183,742

(22) Filed: Apr. 18, 2025

(65) Prior Publication Data

US 2025/0326788 A1 Oct. 23, 2025

Related U.S. Application Data

(60) Provisional application No. 63/636,428, filed on Apr. 19, 2024.

(51) Int. Cl.
C07K 1/30 (2006.01)

(52) U.S. Cl.
CPC .................. C07K 1/303 (2013.01)

(58) Field of Classification Search
None
See application file for complete search history.

(56) References Cited

U.S. PATENT DOCUMENTS

| | | | |
|---|---|---|---|
| 4,208,323 | A | 6/1980 | Murray et al. |
| 4,500,454 | A | 2/1985 | Chang |
| 11,304,435 | B2 | 4/2022 | Foster et al. |
| 11,523,622 | B2 | 12/2022 | Wnukowski et al. |
| 11,571,002 | B2 | 2/2023 | Kizer et al. |
| 11,673,924 | B2 | 6/2023 | Lecocq et al. |
| 2011/0274797 | A1 | 11/2011 | Segall et al. |
| 2017/0238590 | A1 | 8/2017 | Bansal-Mutalik et al. |
| 2018/0355120 | A1 | 12/2018 | Kotaka et al. |
| 2020/0154732 | A1 | 5/2020 | Shi et al. |
| 2021/0274807 | A1 | 9/2021 | Homyak et al. |
| 2021/0276907 | A1 | 9/2021 | Zhang et al. |
| 2022/0015387 | A1 | 1/2022 | Zhang et al. |
| 2022/0022490 | A1 | 1/2022 | Calmon et al. |
| 2022/0030908 | A1 | 2/2022 | Liuming et al. |
| 2022/0039431 | A1 | 2/2022 | Mcfarlane et al. |
| 2022/0046950 | A1 | 2/2022 | Buche et al. |
| 2022/0053793 | A1 | 2/2022 | Schmitt et al. |
| 2022/0117259 | A1 | 4/2022 | Takayanagi et al. |
| 2022/0408773 | A1 | 12/2022 | Bender et al. |
| 2023/0106315 | A1 | 4/2023 | Dlubak et al. |
| 2023/0240322 | A1 | 8/2023 | Segall et al. |

FOREIGN PATENT DOCUMENTS

| | | |
|---|---|---|
| CA | 2878482 | 1/2014 |
| CA | 3010624 | 7/2017 |
| CN | 113115909 | 4/2023 |
| KR | 2024-079333 | 6/2024 |
| WO | WO 2021/260169 | 12/2021 |
| WO | WO 2022/112292 | 6/2022 |
| WO | WO 2022/117917 | 6/2022 |
| WO | WO 2022/136627 | 6/2022 |
| WO | WO 2022/243253 | 11/2022 |
| WO | WO 2023/017033 | 2/2023 |
| WO | WO 2023/137569 | 7/2023 |

OTHER PUBLICATIONS

Adenekan, et al.; "Effect of isolation techniques on the characteristics of pigeon pea (*Cajanus cajan*) protein isolates"; Food Science & Nutrition; vol. 6, No. 1, pp. 146-152 (Jan. 2018).

Chereau et al., "Combination of existing an alternative technologies to promote oilseeds and pulses proteins in food applications", OCL 2016, 23(4) D406.

Cui, et al.; "Identification of extraction pH and cultivar associated aromatic compound changes in spray dried pea protein isolate using untargeted and targeted metabolomic approaches"; Journal of Agriculture and Food Research; vol. 2, No. 100032, pp. 1-10 (Dec. 2020).

Cui, et al.; "Functionality and structure of yellow pea protein isolate as affected by cultivars and extraction pH"; Food Hydrocolloids; vol. 108, No. 106008, pp. 1-13 (Nov. 2020).

Emkani, et al.; "Pea Protein Extraction Assisted by Lactic Fermentation: Impact on Protein Profile and Thermal Properties"; Foods; vol. 10, No. 3, Article 549, pp. 1-15 (2021).

Gao, et al.; "Effect of alkaline extraction pH on structure properties, solubility, and beany flavor of yellow pea protein isolate"; Food Research International; vol. 131, No. 109045, pp. 1-9 (May 2020).

Hansen et al., "Structure-Function Guided Extraction and Scale-Up of Pea Protein Isolate Production", Foods, 11, 3773 (Nov. 23, 2022).

Lam et al., "Pea protein isolates: Structure, extraction, and functionality", Food Reviews International, 34(2), 126-147.

Langton, et al.; "Gelation of faba bean proteins—Effect of extraction method, pH and NaCl"; Food Hydrocolloids; vol. 103, No. 105622, pp. 1-8 (Jun. 2020).

Sethi, et al.; "Optimization of process parameters for extraction of protein isolates from Khesari dhal (*Lathyrus sativus* L)"; LWT; vol. 137, No. 110368, pp. 1-9 (Feb. 2021).

(Continued)

Primary Examiner — Michael V Meller

(74) Attorney, Agent, or Firm — Edward J. Baba; Andrew R. Guzman; Bozicevic, Field & Francis LLP

(57) ABSTRACT

The present disclosure provides an albumin enriched PPI extraction process and albumin enriched PPI produced by the process and use of albumin enriched PPI. The albumin enriched PPI extraction process comprises steps of a) protein extraction from aqueous solution comprising pea flour, b) separation of solids from the aqueous solution, producing a protein-rich liquid fraction, and c) precipitation of protein by use of Na, Ca, or Mg salt or combination thereof, thereby producing an albumin enriched PPI.

7 Claims, 9 Drawing Sheets

(56) References Cited

OTHER PUBLICATIONS

Sun et al., "Gelatin properties of salt-extracted pea protein induced by heat treatment", Food Research International 43 (2010) 509-515.
Tanger et al., "Influence of extraction conditions on the conformational altercation of pea protein extracted from pea flour", Food Hydrocolloids 107 (2020) 105949.
Yang et al., "Selective Complex Coacervation of Pea Whey Proteins with Chitosan To Purify Main 2S Albumins", Journal of Agricultural and Food Chemistry, 2020, 68(6), 1698-1706.

ALBUMIN RICH PEA PROTEIN ISOLATE AND PROCESS FOR PRODUCTION THEREOF

CROSS-REFERENCE TO RELATED APPLICATIONS

This application claims priority benefit to the filing date of U.S. Patent Application Ser. No. 63/636,428, filed on Apr. 19, 2024, the disclosure of which application is herein incorporated by reference in its entirety.

BACKGROUND OF THE INVENTION

Pea protein research and development has grown recently due to their unique functionality compared to soy, wheat, and other plant proteins. Peas are rich in storage proteins, including salt solution-soluble globulins and water-soluble albumins (Lam et al. (2018) Food Reviews International, 34(2), 126-1470). Globulins make up approximately 80% of total storage protein available in peas and albumins make up the remaining 20% (Chereau et al. (2016) OCL—Oilseeds and Fats, Crops and Lipids, 41(1) D406). Plant albumins possess functionality comparable to that of egg white proteins, including their ability to foam, emulsify, gel, and stay soluble at acidic pHs, which could prove valuable in a variety of food, beverage, pharmaceutical, and beauty ingredient applications. During the conventional isoelectric precipitation procedure, which involves a relatively quick pH manipulation combined with intermittent centrifugation stages to aid in the proteins' separation, globulins crash out and are processed into a protein-rich final product (pea protein isolate or PPI). Due to the small molecular size of albumins and water solubility, albumins tend to remain solubilized throughout the entire isoelectric precipitation process unlike their larger and heavier globulin counterparts (Yang et al. (2020) Journal of Agricultural and Food Chemistry, 68(6), 1698-1706). In addition, membrane assisted PPI purification with the albumin fraction is very capital expense- and operating expense-intensive, not sustainable for the plant protein business. Therefore, there is a great need for a new extraction/precipitation method to develop an albumin rich PPI that is highly functional (i.e., has better solubility and heat stability).

SUMMARY OF THE INVENTION

The present disclosure provides an albumin enriched pea protein isolate (PPI) extraction process. More specifically, the albumin enriched pea protein isolate (PPI) extraction process comprises a salt extraction step using Na, Ca, or Mg salt or a combination thereof. In some embodiments, the albumin enriched pea protein isolate (PPI) extraction process comprises a salt extraction step in combination with isoelectric precipitation (IEP).

In some aspects, the albumin enriched PPI extraction process comprises steps of a) protein extraction from aqueous solution comprising pea flour, b) separation of solids from the aqueous solution, producing a protein-rich liquid fraction, and c) precipitation of protein, thereby producing an albumin enriched PPI. The c) precipitation of protein comprises use of Na, Ca, or Mg salt or combination thereof.

In some aspects, the albumin enriched PPI extraction process comprises steps of a) protein extraction from aqueous solution comprising pea flour, b) separation of solids from the aqueous solution, producing a protein-rich liquid fraction, and c) precipitating protein at a pH about 4 to 8, at a temperature of about 18° C. to 95° C. for about 5 to 60 minutes, and ii) using Na, Ca, or Mg salt or combination thereof.

In some aspects, the albumin enriched PPI extraction process comprises steps of a) protein extraction from aqueous solution comprising pea flour, b) separation of solids from the aqueous solution, and c-1) precipitating protein at pH 7 to 8 with Na, Ca, or Mg salt or combination thereof; and then c-2) precipitating the remaining fraction of the protein at pH 4 to 5 with Na, Ca, or Mg salt or combination thereof.

In some aspects, the albumin enriched PPI extraction process comprises steps of a) protein extraction from aqueous solution comprising pea flour, b) separation of solids from the aqueous solution, producing a protein-rich liquid fraction, and c) precipitation of protein comprising i) heating the liquid fraction from step b) at a temperature of about 55° C. to 75° C. for about 30 to 60 minutes before the precipitation; and then ii) precipitating protein at a pH about 4 to 8, at a temperature of about 18° C. to 95° C. for about 5 to 60 minutes; and iii) using Na, Ca, or Mg salt or combination thereof. In some embodiments, the heating the liquid fraction from step b) comprises optionally using Na, Ca, or Mg salt or a combination thereof.

In some aspects, the albumin enriched PPI extraction process comprises steps of a) protein extraction from aqueous solution comprising pea flour, b) separation of solids from the aqueous solution, producing a protein-rich liquid fraction, and c) heating the liquid fraction from step b) at a temperature of about 55° C. to 75° C. for about 30 to 60 minutes before the precipitation; c-1) precipitating protein at pH 7 to 8 with Na, Ca, or Mg salt or combination thereof; and then c-2) precipitating the remaining fraction of the protein at pH 4 to 5 with Na, Ca, or Mg salt or combination thereof. In some embodiments, the heating the liquid fraction from step b) comprises optionally using Na, Ca, or Mg salt or a combination thereof.

In some embodiments, the a) protein extraction from aqueous solution comprising pea flour comprises extracting protein at a pH of about 7 to 10 at a temperature of about 18° C. to 60° C. for about 30 to 60 minutes for extraction.

In other embodiments, the protein extraction of step a) optionally comprises use of Na, Ca, or Mg salt or a combination thereof to extract albumin.

In some embodiments, the Na, Ca, or Mg salt in step a) and step c) is selected from NaCl, $CaCl_2$, $MgCl_2$, Sodium hexametaphosphate (SHMP), sodium triphosphate (STP), calcium perchlorate, $CaPOCl_3$, sodium sulfite, sodium bisulfite, sodium thiocyanate, and calcium thiocyanate.

In some embodiments, the separation of step b) is performed by centrifugation. In certain embodiments, the centrifugation is performed at 5000 g for about 10 minutes at room temperature. In certain embodiments, the centrifugation is performed at 15000 g for about 30 minutes at 4° C. In other embodiments, the separation of step b) is performed by decantation.

In some embodiments, the solids of step b) are starch and fiber and the liquid fraction of step b) comprises protein supernatant, vitamins, and minerals.

In some aspects, the albumin enriched PPI extraction process further comprises a step of d) washing the albumin enriched PPI from step c). In some embodiments, the washing of step d) is performed with water at the precipitation pH, such as pH about 4 to about 8.

In other aspects, the albumin enriched PPI extraction process further comprises a step of e) creating a protein slurry of the albumin enriched PPI.

In other aspects, the albumin enriched PPI extraction process further comprises a step of f) dilution of the protein slurry. In some embodiments, the dilution step f) is performed with water and adjusted its pH to about pH 7.

In still other aspects, the albumin enriched PPI extraction process further comprises a step of g) homogenization and sterilization of the protein slurry prior to drying the protein. In some embodiments, the homogenization of step g) is homogenizing the protein slurry by using a high-pressure homogenizer. In some embodiments, the sterilization of step g) is sterilizing the protein slurry in a direct steam injection. In certain embodiments, the sterilization of step g) is performed at a temperature of about 75 to about 140° C. for about 2 seconds to about 10 minutes.

In yet other aspects, the albumin enriched PPI extraction process further comprises a step of h) drying the protein slurry. In some embodiments, the drying the protein slurry of step h) is performed by a freeze drying or spray drying.

The present disclosure provides an albumin enriched PPI produced by the process of the present disclosure.

In some embodiments, the albumin enriched PPI has a protein content in the range of about 80 to about 90 wt % (Nx6.25) on a dry basis. In other embodiments, the albumin enriched PPI comprise PS-I albumin and PS-II albumin. In certain embodiments, the albumin enriched PPI has a unique composition, containing both PS-I albumin and PS-II albumin (20 to 60% more than conventional PPI). In still other embodiments, the albumin enriched PPI comprises about 10 to about 30% albumin.

In some embodiments, the albumin enriched PPI has protein solubility improved by at least 50% as compared with conventional PPI with less albumin. In other embodiments, the albumin enriched PPI has protein heat stability improved by at least 50% as compared with conventional PPI with less albumin. In still other embodiments, the albumin enriched PPI has improved protein yield by about 8 to about 10% as compared with conventional PPI with less albumin. Herein, the conventional PPI with less albumin is produced by the conventional PPI extraction process depicted in FIG. 1. The conventional PPI extraction process does not comprise the albumin precipitation step using Na, Ca, or Mg salt or combination thereof of the present invention.

In some embodiments, the albumin enriched PPI is substantially in its native form.

In some aspects, the present disclosure further provides use of the albumin enriched PPI of the present disclosure in the production of a foam. In other aspects, the present invention provides use of the albumin enriched PPI of the present disclosure in the production of a gel. In still other aspects, the present invention provides use of the albumin enriched PPI of the present disclosure in the production of an emulsion. In some embodiments, the emulsion is made from a mixture of equal parts oil and water.

In some aspects, the present disclosure provides a foam comprising the albumin enriched PPI of the present disclosure. In other aspects, the present disclosure provides a gel comprising the albumin enriched PPI of the present disclosure. In other aspects, the present disclosure provides an emulsion comprising the albumin enriched PPI of the present disclosure.

In still other aspects, the present disclosure provides use of the albumin enriched PPI of the present disclosure in a food or beverage application. In some embodiments, the food or beverage application is selected from milk shake, protein bars, meat analogues, confectionary, condiments, mayonnaise, salad dressing, nutritional supplements and diary alternatives. In certain embodiments, the dairy alternative is selected from creamers, ice cream, yogurt, buttermilk and cheese.

In yet other aspects, the present disclosure provides a food or beverage comprising the albumin enriched PPI of the present disclosure.

DETAILED DESCRIPTION OF THE INVENTION

Figure 1:
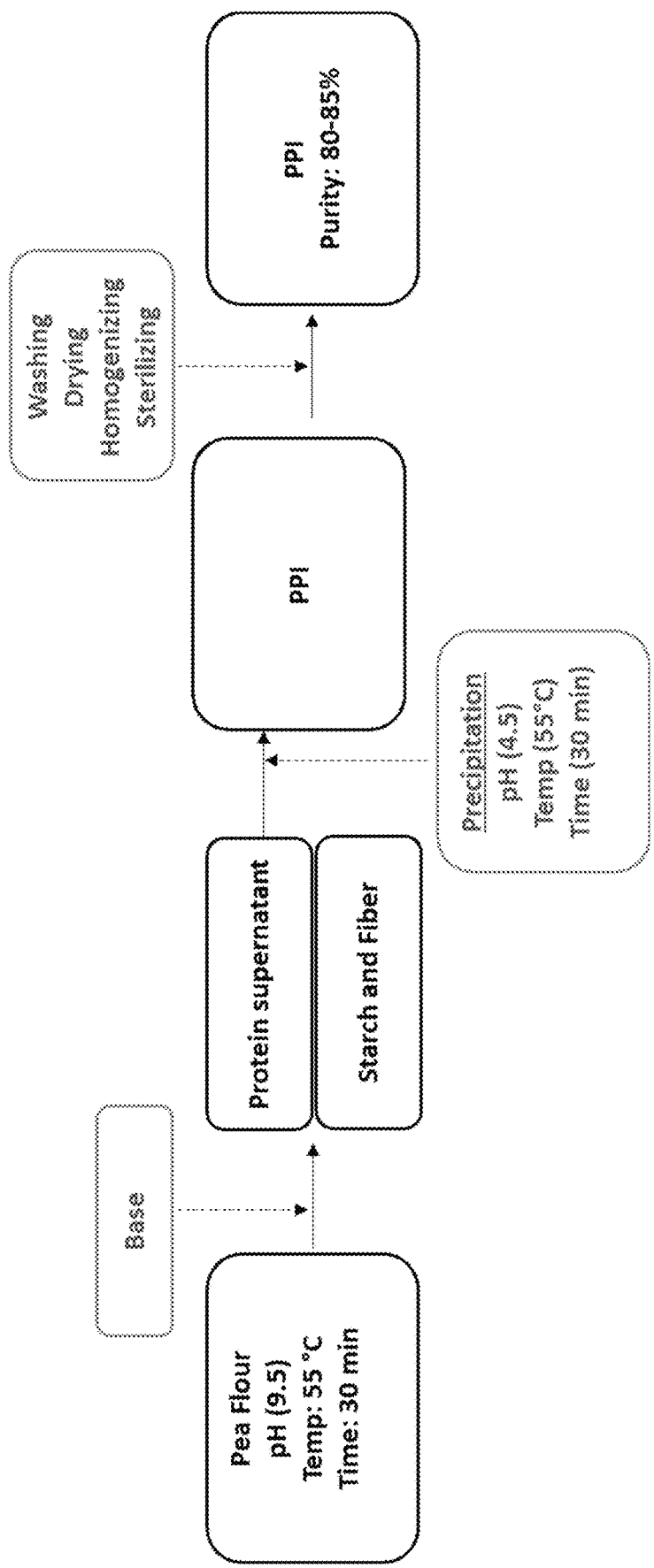
FIG. 1 shows a diagram of the conventional PPI extraction process.

The present disclosure provides a pea protein isolate (PPI) extraction process. More specifically, the pea protein isolate (PPI) extraction process comprises steps of a) protein extraction from aqueous solution comprising pea flour, b) separation of solids from the aqueous solution, producing a protein-rich liquid fraction, and c) precipitation of protein by use of Na, Ca, or Mg salt or combination thereof, thereby producing an albumin enriched PPI.

Before the present processes, compositions and uses are described, it is to be understood that this invention is not limited to the particular methods or compositions described, which may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

The term "about", particularly in reference to a given quantity, is meant to encompass deviations of plus or minus five percent.

"Extracting" or "extraction" means the removal or separation of one or more component(s) of a multicomponent composition. The concept of extracting a protein isolate from a seed protein flour is well known in the present art.

The term "pea protein isolate (PPI)" used herein refers to the final product of pea protein extraction from the pulse of legumes of the genus *Pisum*. It's a highly concentrated protein substance. Pea protein isolate is the extracted protein created through a chemical process that separates protein from other elements of peas.

"Substantially in native form" in the context of proteins extracted from plants means that the proteins have not been denatured due to, for example, exposure to excessive heat, so that the 3-dimensional structure of the proteins are generally maintained in the form found in the pre-processed seed.

"Conventional PPI" used herein refers to PPI with substantially less albumin than the present invention, produced by the conventional PPI extraction process, which is well known technique in the art. The conventional PPI extraction process is depicted in FIG. 1. The conventional PPI contains virtually no albumin. The conventional PPI extraction may be applied to any of the legumes recited herein and may be referred to as "Conventional LPI"

The term "temperature pretreatment" and "heat treatment" are interchangeably used herein.

The term "minimum gelling concentration" as used herein refers to the minimum protein concentration need to form a stable gel in water. Minimum gelling concentration may also be referred to as "least gelation concentration" or "minimum gelation concentration".

Pea Protein Isolate (PPI) Extraction Process

The present disclosure provides a pea protein isolate (PPI) extraction process. More specifically, the pea protein isolate (PPI) is prepared by the utilization of salt in the pea protein isolate extraction process, either at the initial protein extraction step and/or at protein precipitation step. In some embodiments, the albumin enriched pea protein isolate (PPI) extraction process comprises a salt extraction step in combination with isoelectric precipitation (IEP) or alkaline extraction/isoelectric precipitation (AE/IEP). In some embodiments, the albumin enriched pea protein isolate (PPI) extraction process comprises a salt extraction step in combination with isoelectric precipitation (IEP). In some embodiments, the albumin enriched pea protein isolate (PPI) extraction process comprises a salt extraction step in combination with alkaline extraction/isoelectric precipitation (AE/IEP).

The pea protein isolate extraction processes of the present disclosure may be applied to other legumes and may be referred to as a legume protein isolate extraction process. The legumes may be any of the legumes disclosed below.

In some aspects, the albumin enriched PPI extraction process comprises steps of a) protein extraction from aqueous solution comprising pea flour, b) separation of solids from the aqueous solution, producing a protein-rich liquid fraction, and c) precipitation of protein, thereby producing an albumin enriched PPI. The c) precipitation of protein comprises use of Na, Ca, or Mg salt or combination thereof.

Starting Materials

Prior to preparing starting materials such as pea flour or flour derived from other beans for protein extraction, any kind of beans or peas which contain albumin as a source can be used herein. Pea protein can be classified into four major groups: albumin, globulin, prolamin, and glutelin, where the majority are globulins (65-80%) and albumins (10-20%). For example, beans or peas which contain albumin include, but are not limited to, legumes, soybeans, and winged beans. The legumes include, but are not limited to chickpeas, garbanzo beans, lentils, peas, green peas, kidney beans, black beans, soy beans, pinto beans, navy beans, peanuts, haricot bean, lima bean, butter bean, adzuki bean, *mungo* bean, golden gram, black gram, green gram, scarlet runner bean, rice bean, moth bean, tepary bean, *faba* bean, horse bean, broad bean, field bean, Bengal gram, cowpea, blackeye pea, pigeon pea, congo bean, Bambara groundnut, earth pea, and the like.

In some embodiments, the flour is produced from pea. In some embodiments, the flour is produced from green pea. In some embodiments, the flour is produced from chickpea. In some embodiments, the flour is produced from garbanzo bean. In some embodiments, the flour is produced from lentils. In some embodiments, the flour is produced from kidney bean. In some embodiments, the flour is produced from black bean. In some embodiments, the flour is produced from soy bean. In some embodiments, the flour is produced from pinto bean. In some embodiments, the flour is produced from navy bean. In some embodiments, the flour is produced from peanut. In some embodiments, the flour is produced from haricot bean. In some embodiments, the flour is produced from lima bean. In some embodiments, the flour is produced from butter bean. In some embodiments, the flour is produced from adzuki bean. In some embodiments, the flour is produced from *mungo* bean. In some embodiments, the flour is produced from golden gram. In some embodiments, the flour is produced from green gram. In some embodiments, the flour is produced from black gram. In some embodiments, the flour is produced from scarlet runner bean. In some embodiments, the flour is produced from rice bean. In some embodiments, the flour is produced from moth bean. In some embodiments, the flour is produced from tepary bean. In some embodiments, the flour is produced from *faba* bean. In some embodiments, the flour is produced from horse bean. In some embodiments, the flour is produced from broad bean. In some embodiments, the flour is produced from field bean. In some embodiments, the flour is produced from Bengal gram. In some embodiments, the flour is produced from cowpea. In some embodiments, the flour is produced from blackeye pea. In some embodiments, the flour is produced from pigeon pea. In some embodiments, the flour is produced from congo bean. In some embodiments, the flour is produced from Bambra groundnut. In some embodiments, the flour is produced from earth pea.

In some embodiments, starting materials for pea protein extraction may be pea flour and the like. In order to prepare the starting materials, raw pea seeds undergo pre-treatment steps such as cleaning, drying, sorting, dehulling, and splitting that allow the detachment of the hulls and the cotyledons from whole pulses. This pre-treatment to pea seeds is well-known technique in the art.

In some embodiments, starting materials for legume protein extraction may be any of the legume flours discussed above. In order to prepare the starting materials, raw legume seeds undergo pre-treatment steps such as cleaning, drying, sorting, dehulling, and splitting that allow the detachment of the hulls and the cotyledons from whole pulses. This pre-treatment to legume seeds is well-known technique in the art.

a) Protein Extraction

In some aspects, the albumin enriched PPI extraction process comprises a) protein extraction from aqueous solution comprising pea flour. In some aspects, the albumin enriched PPI extraction process comprises a) protein extraction from aqueous solution comprising legume flour. In some embodiments, the protein extraction step a) is performed without Na, Ca, or Mg salt or combination thereof. In other embodiments, the protein extraction step a) is performed with Na, Ca, or Mg salt or combination thereof. When the a) protein extraction step comprises using Na, Ca, or Mg salt or a combination thereof, it is called salt-induced protein extraction herein. When the a) protein extraction step does not include using Na, Ca, or Mg salt or a combination thereof, it is called isoelectric protein extraction herein. In some cases, the isoelectric extraction step uses pH adjustment to extract protein.

In some embodiments, the aqueous solution comprising pea flour is mixture of water and pea flour which was prepared by pretreatment step. In some embodiments, the aqueous solution comprising legume flour is mixture of water and legume flour which was prepared by pretreatment step. In some cases, the ratio of flour and water is 1:4, 1:5, 1:6, 1:7, 1:8, 1:9, 1:10, 1:11, 1:12, 1:13, 1:14, 1:15, 1:16, 1:17, 1:18, 1:19, 1:20, 1:21, 1:25, 1:30.

In some embodiments, the protein extraction step a) is performed by regulating pHs. In some embodiments, the protein extraction of step a) is performed at a pH of about 7 to 10. In certain embodiments, pH of the salt extraction of step a) is in the range of pH 7 to 9.5, pH 7 to 9, pH 7 to 8.5, pH 7 to 8, pH 7 to 7.5, pH 7.5 to 10, pH 7.5 to 9.5, pH 7.5 to 9, pH 8 to pH 9.5, or pH 8.5 to 9.5. In certain cases, pH of the salt extraction of step a) is in the range of pH 7 to 9.5.

In some embodiments, the protein extraction step a) is performed at a temperature of about 18° C. to about 95° C. In certain embodiments, the temperature for the salt extraction of step a) is in the range of about 20 to about 95° C., about 25 to about 95° C., about 30 to about 95° C., about 35 to about 95° C., about 40 to about 95° C., about 45 to about 95° C., about 50 to about 95° C., about 55 to about 95° C., about 60 to about 95° C., about 65 to about 95° C., about 70 to about 95° C., about 50 to about 90° C., about 50 to about 85° C., about 50 to about 80° C., about 50 to about 75° C., about 50 to about 70° C., about 60 to about 95° C., about 60 to about 90° C., about 60 to about 85° C., about 60 to about 80° C., about 60 to about 75° C., about 18 to about 60° C., about 18 to about 50° C., about 18 to about 40° C., or about 18 to about 35° C. In certain cases, the temperature for the salt extraction of step a) is in the range of about 55 to about 95° C. In certain cases, the temperature for the salt extraction of step a) is in the range of about 18 to about 60° C.

In some embodiments, the time for protein extraction of step a) is in the range of about 30 to 60 minutes for extraction. In certain embodiments, the time for salt extraction of step a) is about 30 minutes, 35 minutes, about 40 minutes, about 45 minutes, about 50 minutes, about 55 minutes, or about 60 minutes.

In some embodiments, the protein extraction step a) is optionally done by utilizing one or more types of salt. In some embodiments, the salt is Na, Ca, or Mg salt or combination thereof. In certain embodiments, the salt is selected from the group consisting of NaCl, $CaCl_2$, $MgCl_2$, Sodium hexametaphosphate (SHMP), sodium triphosphate (STP), $CaPOCl_3$, calcium perchlorate, sodium sulfite, sodium bisulfite, sodium thiocyanate, and calcium thiocyanate. In certain embodiments, the salt is SHMP, STP, $CaPOCl_3$, or calcium perchlorate, or combinations thereof. In certain embodiments, the salt is SHMP. In certain embodiments, the salt is STP. In certain embodiments, the salt is $CaPOCl_3$. In certain embodiments, the salt is NaCl. In certain embodiments, the salt is $CaCl_2$. In certain embodiments, the salt is $MgCl_2$. In certain embodiments, the salt is calcium perchlorate. In certain embodiments, the salt is sodium sulfite. In certain embodiments, the salt is sodium bisulfite. In certain embodiments, the salt is sodium thiocyanate. In certain embodiments, the salt is calcium perchlorate.

In some embodiments, the protein extraction step a) optionally includes about 0.5 to about 5% concentration of the salt. In certain embodiments, the concentration of the salt is in the range of about 0.5 to about 5%, about 0.5 to about 4.5%, about 0.5 to about 4.0%, about 0.5 to about 3.5%, about 0.5 to about 3%, about 0.5 to about 2.5%, about 0.5 to about 2%, about 1 to about 5%, about 1.5 to about 5%, about 2 to about 5%, about 2.5 to about 5%, about 2.5 to about 5%, about 2.5 to about 5%, about 2.5 to about 5%, about 2.5 to about 4.5%, about 2.5 to about 4%, about 2.5 to about 3.5%, or about 2.5 to about 3%. In certain embodiments, the concentration of the salt is 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5%.

In some embodiments, the protein extraction step a) optionally includes about 0.25 to about 5% concentration of the salt. In certain embodiments, the concentration of the salt is in the range of about 0.25 to about 5%, about 0.25 to about 4.5%, about 0.25 to about 4.0%, about 0.25 to about 3.5%, about 0.25 to about 3%, about 0.25 to about 2.5%, about 0.25 to about 2%. In some embodiments, the concentration of the salt is in the range of about 0.25 to about 2%.

In some embodiments, solid concentration of the resultant obtained from the protein extraction step a) is about 3 to 30%. In certain embodiments, solid concentration of the resultant obtained from the salt extraction in step a) is about 3 to 25%, about 3 to 20%, about 3 to 15%, about 3 to 10%, about 10 to 20%, or 15 to 20%.

b) Separation of Solids from the Aqueous Solution

In some aspects, the pea protein isolate (PPI) extraction process further comprises b) separation of solids from the solution, producing a protein-rich liquid fraction. In certain embodiments, the liquid fraction from step b) is supernatant. For example, the liquid fraction includes protein, mineral, vitamin, and the like.

In some embodiments, the separation of step b) is performed by centrifugation. The solids are then separated from the aqueous component, producing a liquid fraction for further processing. Means for separating solids from aqueous component are well known in the art. A common method of separation is centrifugation. In certain embodiments, the centrifugation is performed at 5000 g for about 10 minutes at room temperature. In certain embodiments, the centrifugation is performed at 15000 g for about 30 minutes at 4° C.

In other embodiments, the separation of step b) is performed by decanting. Any method or combination of methods of separation may be employed, and the determination of a proper method of separating a liquid fraction from the solids is well within the skill of the ordinary artisan.

c) Precipitation of Protein

In some aspects, the albumin enriched PPI extraction process comprises steps of a) protein extraction from aqueous solution comprising pea flour, b) separation of solids from the aqueous solution, producing a protein-rich liquid fraction, and c) precipitation of protein, thereby producing an albumin enriched PPI. The c) precipitation of protein comprises use of Na, Ca, or Mg salt or combination thereof.

In some aspects, the albumin enriched legume protein isolate extraction process comprises steps of a) protein extraction from aqueous solution comprising legume flour, b) separation of solids from the aqueous solution, producing a protein-rich liquid fraction, and c) precipitation of protein, thereby producing an albumin enriched legume protein isolate. The c) precipitation of protein comprises use of Na, Ca, or Mg salt or combination thereof.

In some embodiments, the precipitation of protein of step c) is performed at a pH about 4 to about 8. In certain embodiments, pH of the precipitation of protein of step d) is in the range of pH 4 to 7.5, pH 4 to 7, pH 5 to 8, pH 5 to 7.5, or pH 5 to 7. In certain cases, pH of the salt extraction of step a) is in the range of pH 4 to 7.

In some embodiments, the precipitation of protein of step c) is performed for 30 minutes to 60 minutes. In certain embodiments, precipitation of protein is performed for about 30 minutes, about 35 minutes, about 40 minutes, about 45 minutes, about 50 minutes, about 55 minutes, or about 60 minutes.

In some embodiments, the precipitation time of step c) is about 5 minutes to 60 minutes. In certain embodiments, time for the precipitation of protein of step c) is about 5 minutes, about 10 minutes, about 15 minutes, about 20 minutes, about 25 minutes, about 30 minutes, about 35 minutes, about 40 minutes, about 45 minutes, about 50 minutes, about 55 minutes, or about 60 minutes.

In some embodiments, the precipitation of protein step c) is performed at a temperature in the range of about 18 to about 60° C., about 18 to about 55° C., about 18 to about 50° C., about 18 to about 45° C., about 20 to about 60° C., about 20 to about 55° C., about 20 to about 50° C., about 20 to about 45° C., about 20 to about 40° C., about 25 to about 60° C., about 25 to about 50° C., about 30 to about 60° C., about 30 to about 55° C.

In some embodiments, the precipitation of protein of step c) is performed with Na, Ca, or Mg salt or combination thereof. In certain embodiments, the Na, Ca or Mg salt in step c) is selected from NaCl, $CaCl_2$, $MgCl_2$, sodium hexametaphosphate (SHMP), sodium triphosphate (STP), calcium perchlorate, sodium sulfite, sodium bisulfite, sodium thiocyanate and calcium thiocyanate. In certain embodiments, the salt is SHMP, STP, calcium perchlorate, or $CaPOCl_3$, or combination thereof. In certain embodiments, the salt is SHMP.

In some embodiments, the salt(s) for the precipitation of protein of step c) are at a total concentration of about 0.1 to about 5%. In certain embodiments, the concentration of the salt is in the range of about 0.5 to about 5%, about 0.5 to about 4.5%, about 0.5 to about 4.0%, about 0.5 to about 3.5%, about 0.5 to about 3%, about 0.5 to about 2.5%, about 0.5 to about 2%, about 1 to about 5%, about 1.5 to about 5%, about 2 to about 5%, about 2.5 to about 5%, about 2.5 to about 5%, about 2.5 to about 4.5%, about 2.5 to about 4%, about 2.5 to about 3.5%, or about 2.5 to about 3%. In certain embodiments, the concentration of the salt is 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5%.

In some aspects, the c) precipitation of protein comprises double precipitation process to improve albumin and/or globulin content. In some embodiments, the double precipitation process comprises c-1) precipitating protein at pH 7 to 8 with Na, Ca, or Mg salt or combination thereof; and then c-2) precipitating the remaining fraction of the protein at pH 4 to 5 with Na, Ca, or Mg salt or combination thereof.

In some embodiments, the precipitation of protein of c-1) step is done at the range of pH 7 to pH 9, pH 7 to pH 8.5, pH 7 to pH 8. In some cases, the precipitation protein of c-1) step is done at pH 7, pH 7.1, pH 7.2, pH 7.3, pH 7.3, pH 7.5, pH 7.6, pH 7.7, pH 7.8, pH 7.9, pH 8.0, pH 8.5, pH 9.0. In some embodiments, the precipitation of protein of step c-1) is performed for 5 minutes to 60 minutes. In certain embodiments, precipitation of protein is performed for about 5 to 10 minutes, about 10 to 15 minutes, about 15 to 20 minutes, about 20 to 25 minutes, about 25 to 30 minutes, or about 30 minutes. In other embodiments, In certain embodiments, precipitation of protein is performed for about 30 to 35 minutes, about 35 to 40 minutes, about 40 to 45 minutes, about 45 to 50 minutes, about 50 to 55 minutes, or about 55 to 60 minutes.

In some embodiments, the precipitation of the remaining fraction of the protein of c-2) step is done at the range of pH 4 to 6, pH 4 to 5.5, pH 4 to 5. In some cases, the precipitation of the remaining fraction of the protein of c-2) step is done at pH 4, pH 4.1, pH 4.2, pH 4.3, pH 4.4, pH 4.5, pH 4.6, pH 4.7, pH 4.8, pH 4.9, pH 5.0, pH 5.1, pH 5.2, pH 5.3, pH 5.4, pH 5.5, pH 5.6, pH 5.7, pH 5.8, pH 5.9, pH 6.0. In some embodiments, the precipitation of the remaining fraction of step c-2) is performed for 5 minutes to 30 minutes. In certain embodiments, the precipitation of the remaining fraction of step c-2) is performed for about 5 to 10 minutes, about 10 to 15 minutes, about 15 to 20 minutes, about 20 to 25 minutes, about 25 to 30 minutes, or about 30 minutes. In other embodiments, In certain embodiments, precipitation of the remaining fraction of step c-2) is performed for about 30 to 35 minutes, about 35 to 40 minutes, about 40 to 45 minutes, about 45 to 50 minutes, about 50 to 55 minutes, or about 55 to 60 minutes.

In some aspects, the pea protein isolate (PPI) extraction process optionally comprises heat pretreatment of the liquid fraction from step b) prior to the precipitation.

In some aspects, the legume protein isolate (LPI) extraction process optionally comprises heat pretreatment of the liquid fraction from step b) prior to the precipitation.

In some embodiments, the heat treatment of the liquid fraction from step b) is performed at a temperature of about 50° C. to about 80° C., about 55° C. to about 75° C., about 55° C. to about 80° C., about 50° C. to about 80° C., about 50° C. to about 80° C., about 50° C. to about 80° C., about 50° C. to about 80° C., about 50° C. to about 80° C., about 50° C. to about 80° C., or about 50° C. to about 80° C. In certain embodiments, the heat treatment of the liquid fraction from step b) is performed at a temperature of about 55° C. to about 75° C.

In some embodiments, time for the heat treatment of the liquid fraction from step b) is about 30 minutes to 60 minutes. In certain embodiments, time for the heat treatment of the liquid fraction from step b) is about 30 minutes, about 35 minutes, about 40 minutes, about 45 minutes, about 50 minutes, about 55 minutes, or about 60 minutes.

In some embodiments, the heat treatment of the liquid fraction from step b) may be optionally performed with Na, Ca, or Mg salt or combination thereof. In certain embodiments, the Na, Ca or Mg salt is selected from NaCl, $CaCl_2$, $MgCl_2$, sodium hexametaphosphate (SHMP), $CaPOCl_3$, sodium triphosphate (STP), calcium perchlorate, sodium sulfite, sodium bisulfite, sodium thiocyanate, and calcium thiocyanate. In certain embodiments, the salt is SHMP or $CaPOCl_3$. In other embodiments, the heat treatment of the liquid fraction from step b) may be performed without Na, Ca, or Mg salt or combination thereof.

In some embodiments, the salt(s) for the heat treatment are at a total concentration of about 0.1 to about 5%. In certain embodiments, the concentration of the salt is in the range of about 0.5 to about 5%, about 0.5 to about 4.5%, about 0.5 to about 4.0%, about 0.5 to about 3.5%, about 0.5 to about 3%, about 0.5 to about 2.5%, about 0.5 to about 2%, about 1 to about 5%, about 1.5 to about 5%, about 2 to about 5%, about 2.5 to about 5%, about 2.5 to about 5%, about 2.5 to about 5%, about 2.5 to about 5%, about 2.5 to about 4.5%, about 2.5 to about 4%, about 2.5 to about 3.5%, or about 2.5 to about 3%. In certain embodiments, the concentration of the salt is 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5%.

Salt Usage in Steps a) and/or c).

In some aspect, the pea protein isolate (PPI) extraction process comprises a) protein extraction from aqueous solution comprising pea flour without Na, Ca, or Mg salt or combinations thereof, b) separation of solids from the aqueous solution, producing a protein-rich liquid fraction, and c) precipitation of protein with Na, Ca, or Mg salt or combinations thereof. In certain embodiments, the Na, Ca or Mg salt is selected from NaCl, $CaCl_2$, $MgCl_2$, sodium hexametaphosphate (SHMP), $CaPOCl_3$, sodium triphosphate (STP), calcium perchlorate, sodium sulfite, sodium bisulfite, sodium thiocyanate, and calcium thiocyanate. In certain embodiments, the salt is SHMP. In certain embodiments, the salt is $CaPOCl_3$. In certain embodiments, the salt is STP.

In some aspect, the legume protein isolate (LPI) extraction process comprises a) protein extraction from aqueous solution comprising legume flour without Na, Ca, or Mg salt or combinations thereof, b) separation of solids from the aqueous solution, producing a protein-rich liquid fraction, and c) precipitation of protein with Na, Ca, or Mg salt or combinations thereof. In certain embodiments, the Na, Ca or Mg salt is selected from NaCl, $CaCl_2$, $MgCl_2$, sodium hexametaphosphate (SHMP), $CaPOCl_3$, sodium triphosphate (STP), calcium perchlorate, sodium sulfite, sodium bisulfite, sodium thiocyanate, and calcium thiocyanate. In certain embodiments, the salt is SHMP. In certain embodiments, the salt is $CaPOCl_3$. In certain embodiments, the salt is STP.

In some aspect, the pea protein isolate (PPI) extraction process comprises a) protein extraction from aqueous solution comprising pea flour without Na, Ca, or Mg salt or combinations thereof, b) separation of solids from the aqueous solution, producing a protein-rich liquid fraction, and c-1) precipitating protein at pH 7 to 8 with Na, Ca, or Mg salt or combinations thereof; and then c-2) precipitating the remaining fraction of the protein at pH 4 to 5 with Na, Ca, or Mg salt or combinations thereof. In certain embodiments, the Na, Ca or Mg salt is selected from NaCl, $CaCl_2$, $MgCl_2$, sodium hexametaphosphate (SHMP), $CaPOCl_3$, sodium triphosphate (STP), calcium perchlorate, sodium sulfite, sodium bisulfite, sodium thiocyanate and calcium thiocyanate. In certain embodiments, the salt is SHMP. In certain embodiments, the salt is $CaPOCl_3$. In certain embodiments, the salt is STP.

In some aspect, the legume protein isolate (LPI) extraction process comprises a) protein extraction from aqueous solution comprising legume flour without Na, Ca, or Mg salt or combinations thereof, b) separation of solids from the aqueous solution, producing a protein-rich liquid fraction, and c-1) precipitating protein at pH 7 to 8 with Na, Ca, or Mg salt or combinations thereof; and then c-2) precipitating the remaining fraction of the protein at pH 4 to 5 with Na, Ca, or Mg salt or combinations thereof. In certain embodiments, the Na, Ca or Mg salt is selected from NaCl, $CaCl_2$, $MgCl_2$, sodium hexametaphosphate (SHMP), $CaPOCl_3$, sodium triphosphate (STP), calcium perchlorate, sodium sulfite, sodium bisulfite, sodium thiocyanate and calcium thiocyanate. In certain embodiments, the salt is SHMP. In certain embodiments, the salt is $CaPOCl_3$. In certain embodiments, the salt is STP.

In some aspect, the pea protein isolate (PPI) extraction process comprises a) protein extraction from aqueous solution comprising pea flour with Na, Ca, or Mg salt or combinations thereof, b) separation of solids from the aqueous solution, producing a protein-rich liquid fraction, and c) precipitation of protein without Na, Ca, or Mg salt or combinations thereof. In certain embodiments, the Na, Ca or Mg salt is selected from NaCl, $CaCl_2$, $MgCl_2$, sodium hexametaphosphate (SHMP), $CaPOCl_3$, sodium triphosphate (STP), calcium perchlorate, sodium sulfite, sodium bisulfite, sodium thiocyanate, and calcium thiocyanate. In certain embodiments, the salt is SHMP. In certain embodiments, the salt is $CaPOCl_3$. In certain embodiments, the salt is STP.

In some aspect, the legume protein isolate (LPI) extraction process comprises a) protein extraction from aqueous solution comprising legume flour with Na, Ca, or Mg salt or combinations thereof, b) separation of solids from the aqueous solution, producing a protein-rich liquid fraction, and c)

precipitation of protein without Na, Ca, or Mg salt or combinations thereof. In certain embodiments, the Na, Ca, or Mg salt is selected from NaCl, CaCl$_2$, MgCl$_2$, sodium hexametaphosphate (SHMP), CaPOCl$_3$, sodium triphosphate (STP), calcium perchlorate, sodium sulfite, sodium bisulfite, sodium thiocyanate, and calcium thiocyanate. In certain embodiments, the salt is SHMP. In certain embodiments, the salt is CaPOCl$_3$. In certain embodiments, the salt is STP.

In some aspect, the pea protein isolate (PPI) extraction process comprises a) protein extraction from aqueous solution comprising pea flour with Na, Ca, or Mg salt or combinations thereof, b) separation of solids from the aqueous solution, producing a protein-rich liquid fraction, and c-1) precipitating protein at pH 7 to 8 without Na, Ca, or Mg salt or combinations thereof; and then c-2) precipitating the remaining fraction of the protein at pH 4 to 5 without Na, Ca, or Mg salt or combinations thereof. In certain embodiments, the Na, Ca or Mg salt is selected from NaCl, CaCl$_2$, MgCl$_2$, sodium hexametaphosphate (SHMP), CaPOCl$_3$, sodium triphosphate (STP), calcium perchlorate, sodium sulfite, sodium bisulfite, sodium thiocyanate and calcium thiocyanate. In certain embodiments, the salt is SHMP. In certain embodiments, the salt is CaPOCl$_3$. In certain embodiments, the salt is STP.

In some aspect, the legume protein isolate (LPI) extraction process comprises a) protein extraction from aqueous solution comprising legume flour with Na, Ca, or Mg salt or combinations thereof, b) separation of solids from the aqueous solution, producing a protein-rich liquid fraction, and c-1) precipitating protein at pH 7 to 8 without Na, Ca, or Mg salt or combinations thereof; and then c-2) precipitating the remaining fraction of the protein at pH 4 to 5 without Na, Ca, or Mg salt or combinations thereof. In certain embodiments, the Na, Ca, or Mg salt is selected from NaCl, CaCl$_2$, MgCl$_2$, sodium hexametaphosphate (SHMP), CaPOCl$_3$, sodium triphosphate (STP), calcium perchlorate, sodium sulfite, sodium bisulfite, sodium thiocyanate, and calcium thiocyanate. In certain embodiments, the salt is SHMP. In certain embodiments, the salt is CaPOCl$_3$. In certain embodiments, the salt is STP.

In some aspect, the pea protein isolate (PPI) extraction process comprises a) protein extraction from aqueous solution comprising pea flour with Na, Ca, or Mg salt or combinations thereof, b) separation of solids from the aqueous solution, producing a protein-rich liquid fraction, and c) precipitation of protein with Na, Ca, or Mg salt or combinations thereof. In certain embodiments, the Na, Ca or Mg salt is selected from NaCl, CaCl$_2$, MgCl$_2$, sodium hexametaphosphate (SHMP), CaPOCl$_3$, sodium triphosphate (STP), calcium perchlorate, sodium sulfite, sodium bisulfite, sodium thiocyanate and calcium thiocyanate. In certain embodiments, the salt is SHMP. In certain embodiments, the salt is CaPOCl$_3$. In certain embodiments, the salt is STP.

In some aspect, the legume protein isolate (LPI) extraction process comprises a) protein extraction from aqueous solution comprising legume flour with Na, Ca, or Mg salt or combinations thereof, b) separation of solids from the aqueous solution, producing a protein-rich liquid fraction, and c) precipitation of protein with Na, Ca, or Mg salt or combinations thereof. In certain embodiments, the Na, Ca, or Mg salt is selected from NaCl, CaCl$_2$, MgCl$_2$, sodium hexametaphosphate (SHMP), CaPOCl$_3$, sodium triphosphate (STP), calcium perchlorate, sodium sulfite, sodium bisulfite, sodium thiocyanate, and calcium thiocyanate. In certain embodiments, the salt is SHMP. In certain embodiments, the salt is CaPOCl$_3$. In certain embodiments, the salt is STP.

In some aspect, the pea protein isolate (PPI) extraction process comprises a) protein extraction from aqueous solution comprising pea flour with Na, Ca, or Mg salt or combinations thereof, b) separation of solids from the aqueous solution, producing a protein-rich liquid fraction, and c-1) precipitating protein at pH 7 to 8 with Na, Ca, or Mg salt or combinations thereof; and then c-2) precipitating the remaining fraction of the protein at pH 4 to 5 with Na, Ca, or Mg salt or combinations thereof. In certain embodiments, the Na, Ca or Mg salt is selected from NaCl, CaCl$_2$, MgCl$_2$, sodium hexametaphosphate (SHMP), CaPOCl$_3$, sodium triphosphate (STP), calcium perchlorate, sodium sulfite, sodium bisulfite, sodium thiocyanate and calcium thiocyanate. In certain embodiments, the salt is SHMP. In certain embodiments, the salt is CaPOCl$_3$. In certain embodiments, the salt is STP.

Therefore, any one or more of steps a), c), or c-1) and c-2) for the pea protein isolate (PPI) extraction process include utilization of Na, Ca or Mg salt or combinations thereof.

In some aspect, the legume protein isolate (LPI) extraction process comprises a) protein extraction from aqueous solution comprising legume flour with Na, Ca, or Mg salt or combinations thereof, b) separation of solids from the aqueous solution, producing a protein-rich liquid fraction, and c-1) precipitating protein at pH 7 to 8 with Na, Ca, or Mg salt or combinations thereof; and then c-2) precipitating the remaining fraction of the protein at pH 4 to 5 with Na, Ca, or Mg salt or combinations thereof. In certain embodiments, the Na, Ca or Mg salt is selected from NaCl, CaCl$_2$, MgCl$_2$, sodium hexametaphosphate (SHMP), CaPOCl$_3$, sodium triphosphate (STP), calcium perchlorate, sodium sulfite, sodium bisulfite, sodium thiocyanate and calcium thiocyanate. In certain embodiments, the salt is SHMP. In certain embodiments, the salt is CaPOCl$_3$. In certain embodiments, the salt is STP.

Therefore, any one or more of steps a), c), or c-1) and c-2) for the legume protein isolate (LPI) extraction process include utilization of Na, Ca, or Mg salt or combinations thereof.

d) Washing the Albumin Enriched PPI from Step c)

In some aspects, the albumin enriched PPI extraction process further comprises a step of d) washing the albumin enriched PPI from step c). In some aspects, the albumin enriched LPI extraction process further comprises a step of d) washing the albumin enriched LPI from step c). In some embodiments, the washing of step d) is performed with water at the precipitation pH, such as pH about 4 to about 8. In other embodiments, the protein isolate from step d) is washed two times at precipitation pH such as pH in the range of about 4 to about 8, pH 4 to 7.5, pH 4 to 7, pH 5 to 8, pH 5 to 7.5, or pH 5 to 7. The washing step is a well-known technique in the art.

E) Creating a Protein Slurry of the Albumin Enriched PPI

In other aspects, the albumin enriched PPI extraction process further comprises a step of e) creating a protein slurry of the albumin enriched PPI. Creating a protein slurry is well-known technique in the art.

In other aspects, the albumin enriched LPI extraction process further comprises a step of e) creating a protein slurry of the albumin enriched PPI. Creating a protein slurry is well-known technique in the art.

f) Dilution of the Protein Slurry

In some aspects, the albumin enriched PPI extraction process further comprises a step of f) dilution of the protein slurry. The separated protein is diluted with water and its pH is adjusted to about pH 7, creating a protein slurry. The dilution process is a well-known technique in the art.

In some aspects, the albumin enriched LPI extraction process further comprises a step of f) dilution of the protein slurry. The separated protein is diluted with water and its pH is adjusted to about pH 7, creating a protein slurry. The dilution process is a well-known technique in the art.

g) Homogenization and Sterilization of Protein Slurry

In some aspects, the pea protein isolate (PPI) extraction process further comprises g) homogenization and sterilization of protein slurry. In some embodiments, the protein slurry is homogenized by means known in the art. For example, a high-pressure homogenizer may be used. The homogenized protein slurry is then sterilized and/or pasteurized.

Means for sterilizing protein for use in foods are known in the art. In some embodiments, the sterilization temperature is in the range of 75 to 140° C., 80 to 140° C., 90 to 140° C., 100 to 140° C., 75 to 130° C., 75 to 120° C., 75 to 110° C., or 75 to 100° C. An example of such a means is direct steam injection. The protein slurry may be subjected to direct steam injection for between 2 seconds and 10 minutes, such as 2 seconds, 5 seconds, 10 seconds, 15 seconds, 20 seconds, 25 seconds, 30 seconds, 35 seconds, 40 seconds, 45 seconds, 50 seconds, 55 seconds, 1 minutes, 2 minutes, 3 minutes, 4 minutes, 5 minutes, 6 minutes, 7 minutes, 8 minutes, 9 minutes, 10 minutes.

h) Drying Protein Slurry

In some aspects, the pea protein isolate (PPI) extraction process further comprises h) drying protein slurry. The protein slurry is dried using a drying apparatus known in the art, provided that heat above about 60° C. is not used. Several such apparatuses, such as spray dryers, freeze dryer, ring dryers, dispersion dryers, drum dryers and fluid bed dryers, are commercially available. The resulting pea protein isolate may then be used as further described below.

EMBODIMENTS

Figure 2:
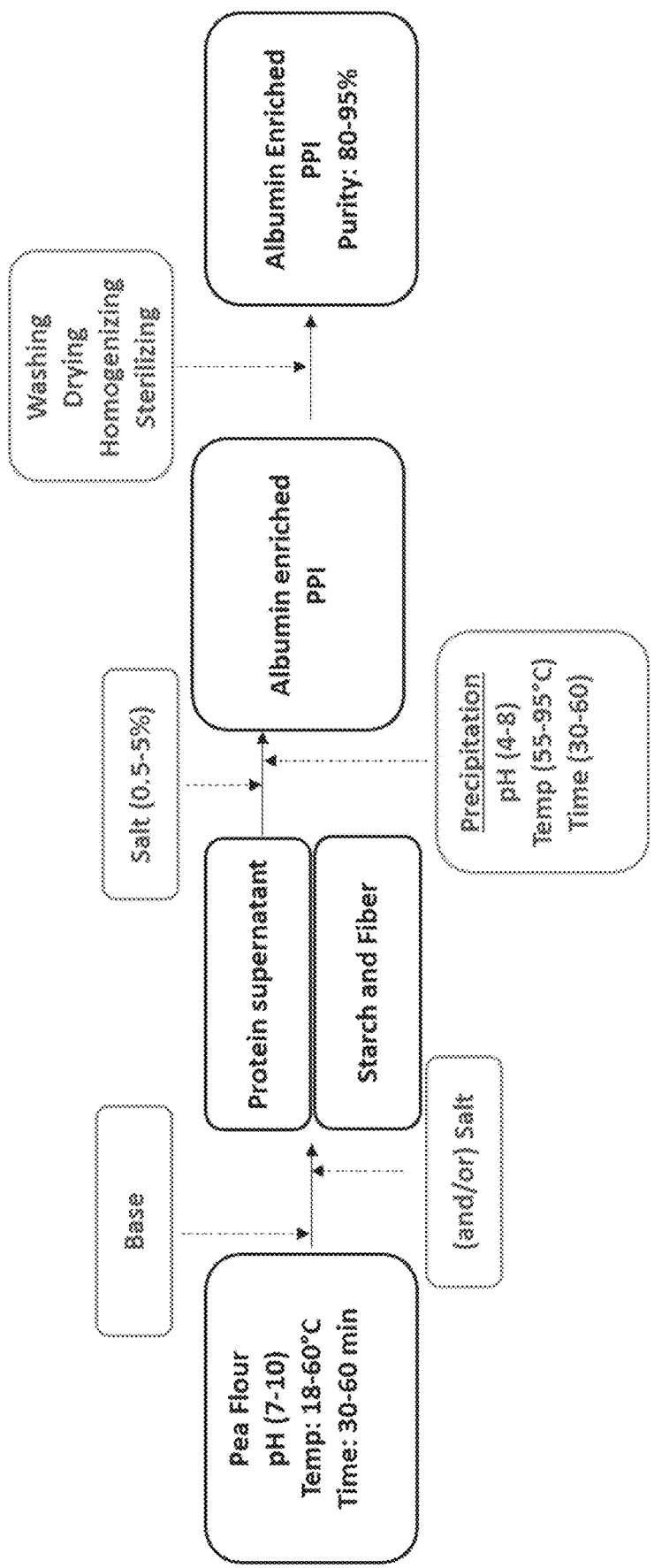
FIG. 2 shows an albumin enriched PPI extraction process as an embodiment of the present disclosure.
Figure 4:
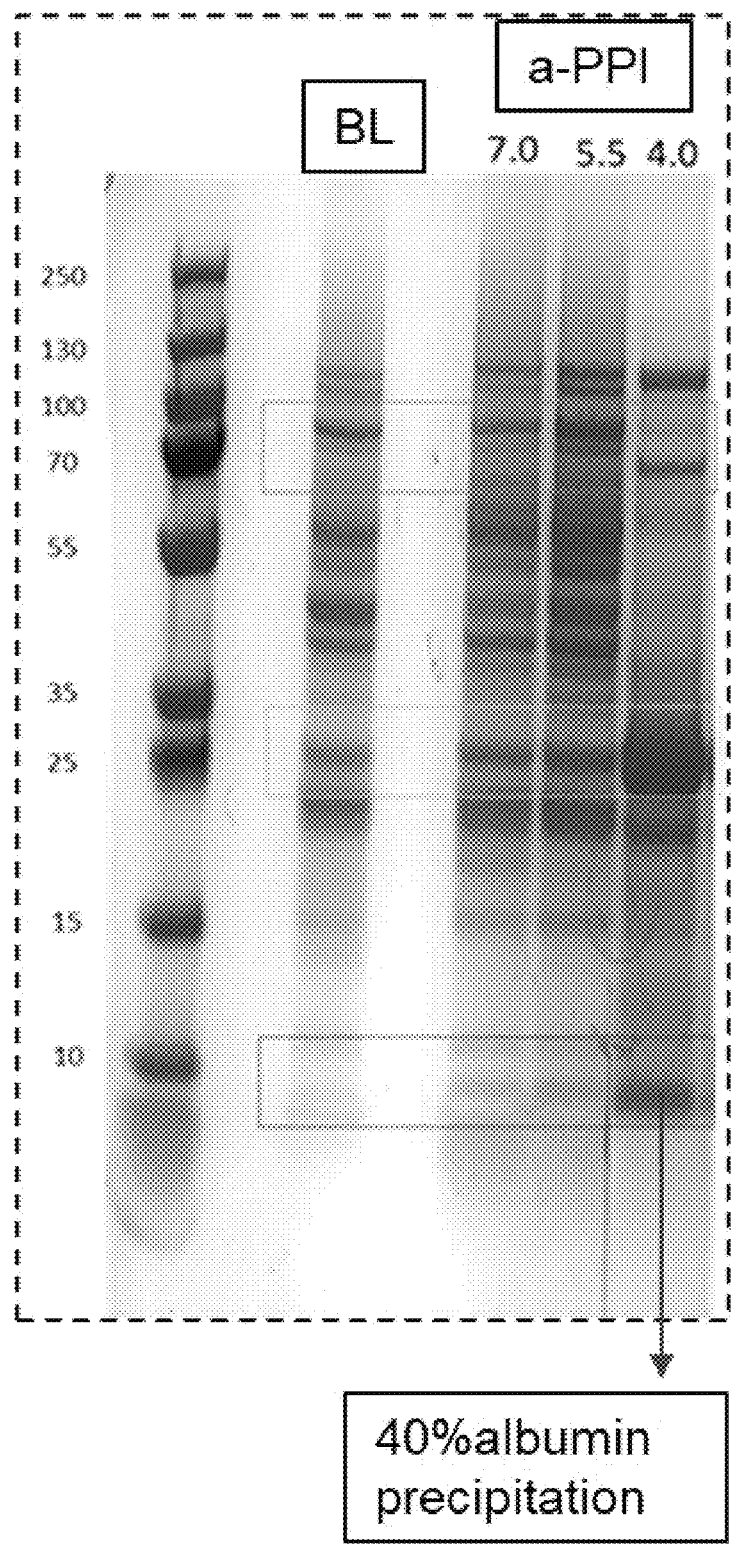
FIG. 4 shows PPI analysis results including albumin enriched PPI by use of SDS PGE.

In some aspects, the present disclosure provides an albumin enriched pea protein isolate (PPI) extraction process is depicted in FIG. 2 or FIG. 4.

In some aspects, the present disclosure provides an albumin enriched pea protein isolate (PPI) extraction process comprising:
　a) protein extraction from aqueous solution comprising pea flour:
　　i) at a pH of about 7 to about 10,
　　ii) at a temperature of about 18° C. to 60° C.,
　　iii) for about 30 to 60 minutes for extraction,
　b) separation of solids from the aqueous solution, producing a liquid fraction,
　c) precipitation of protein comprising:
　　i) precipitating protein at a pH about 4 to 8, at a temperature of about 18° C. to 95° C. for about 5 to 60 minutes,
　　ii) using Na, Ca, or Mg salt or combination thereof,
　d) washing protein isolate from step d), e) creating a protein slurry of the albumin enriched PPI, f) dilution of protein slurry, g) homogenization and sterilization of protein slurry, and h) drying protein slurry, thereby producing albumin enriched PPI.

In other aspects, the present disclosure provides a pea protein isolate (PPI) extraction process comprising:
　a) protein extraction from aqueous solution comprising pea flour:
　　i) at a pH of about 7 to about 10,
　　ii) at a temperature of about 18° C. to 60° C.,
　　iii) for about 30 to 60 minutes for extraction,
　b) separation of solids from the aqueous solution, producing a liquid fraction,
　c) precipitation of protein comprising:
　　c-1) precipitating protein at pH 7 to 8 with Na, Ca, or Mg salt or combination thereof; and then
　　c-2) precipitating the remaining fraction of the protein at pH 4 to 5 with Na, Ca, or Mg salt or combination thereof,
　d) washing protein isolate from step c), e) creating a protein slurry of the albumin enriched PPI, f) dilution of protein slurry, g) homogenization and sterilization of protein slurry, and h) drying protein slurry, thereby producing albumin enriched PPI.

In other aspects, the present disclosure provides a pea protein isolate (PPI) extraction process comprising:
　a) protein extraction from aqueous solution comprising pea flour:
　　i) at a pH of about 7 to about 10,
　　ii) at a temperature of about 18° C. to 60° C.,
　　iii) for about 30 to 60 minutes for extraction,
　b) separation of solids from the aqueous solution, producing a liquid fraction,
　c) precipitation of protein comprising:
　　i) heating the liquid fraction from step b) at a temperature of about 55° C. to 75° C. for about 30 to 60 minutes before the precipitation,
　　ii) precipitating protein at a pH about 4 to 8, at a temperature of about 18° C. to 95° C. for about 5 to 60 minutes,
　　ii) using Na, Ca, or Mg salt or combination thereof,
　d) washing protein isolate from step d), e) creating a protein slurry of the albumin enriched PPI, f) dilution of protein slurry, g) homogenization and sterilization of protein slurry, and h) drying protein slurry, thereby producing albumin enriched PPI.

In yet other aspects, the present disclosure provides a pea protein isolate (PPI) extraction process comprising:
　a) protein extraction from aqueous solution comprising pea flour:
　　i) at a pH of about 7 to about 10,
　　ii) at a temperature of about 18° C. to 60° C.,
　　iii) for about 30 to 60 minutes for extraction,
　b) separation of solids from the aqueous solution, producing a liquid fraction,
　c) precipitation of protein comprising:
　　heating the liquid fraction from step b) at a temperature of about 55° C. to 75° C. for about 30 to 60 minutes before the precipitation, and
　　c-1) precipitating protein at pH 7 to 8 with Na, Ca, or Mg salt or combination thereof; and then
　　c-2) precipitating the remaining fraction of the protein at pH 4 to 5 with Na, Ca, or Mg salt or combination thereof,
　d) washing protein isolate from step c), e) creating a protein slurry of the albumin enriched PPI, f) dilution of protein slurry, g) homogenization and sterilization of protein slurry, and h) drying protein slurry, thereby producing albumin enriched PPI.

In some aspects, the present disclosure provides an albumin enriched pea protein isolate (PPI) extraction process comprising:
　a) protein extraction from aqueous solution comprising pea flour:
　　i) at a pH of about 7 to about 10,
　　ii) at a temperature of about 18° C. to 60° C.,
　　iii) for about 30 to 60 minutes for extraction,
　　iv) using Na, Ca, or Mg salt or combination thereof, b) separation of solids from the aqueous solution, producing a liquid fraction,
c) precipitation of protein comprising:
  i) precipitating protein at a pH about 4 to 8, at a temperature of about 18° C. to 95° C. for about 5 to 60 minutes,
  ii) using Na, Ca, or Mg salt or combination thereof,
d) washing protein isolate from step d), e) creating a protein slurry of the albumin enriched PPI, f) dilution of protein slurry, g) homogenization and sterilization of protein slurry, and h) drying protein slurry, thereby producing albumin enriched PPI.

In other aspects, the present disclosure provides a pea protein isolate (PPI) extraction process comprising:
a) protein extraction from aqueous solution comprising pea flour:
  i) at a pH of about 7 to about 10,
  ii) at a temperature of about 18° C. to 60° C.,
  iii) for about 30 to 60 minutes for extraction,
  iv) using Na, Ca, or Mg salt or combination thereof,
b) separation of solids from the aqueous solution, producing a liquid fraction,
c) precipitation of protein comprising:
  c-1) precipitating protein at pH 7 to 8 with Na, Ca, or Mg salt or combination thereof; and then
  c-2) precipitating the remaining fraction of the protein at pH 4 to 5 with Na, Ca, or Mg salt or combination thereof,
d) washing protein isolate from step c), e) creating a protein slurry of the albumin enriched PPI, f) dilution of protein slurry, g) homogenization and sterilization of protein slurry, and h) drying protein slurry, thereby producing albumin enriched PPI.

In other aspects, the present disclosure provides a pea protein isolate (PPI) extraction process comprising:
a) protein extraction from aqueous solution comprising pea flour:
  i) at a pH of about 7 to about 10,
  ii) at a temperature of about 18° C. to 60° C.,
  iii) for about 30 to 60 minutes for extraction,
  iv) using Na, Ca, or Mg salt or combination thereof,
b) separation of solids from the aqueous solution, producing a liquid fraction,
c) precipitation of protein comprising:
  i) heating the liquid fraction from step b) at a temperature of about 55° C. to 75° C. for about 30 to 60 minutes before the precipitation,
  ii) precipitating protein at a pH about 4 to 8, at a temperature of about 18° C. to 95° C. for about 5 to 60 minutes,
  ii) using Na, Ca, or Mg salt or combination thereof,
d) washing protein isolate from step d), e) creating a protein slurry of the albumin enriched PPI, f) dilution of protein slurry, g) homogenization and sterilization of protein slurry, and h) drying protein slurry, thereby producing albumin enriched PPI.

In yet other aspects, the present disclosure provides a pea protein isolate (PPI) extraction process comprising:
a) protein extraction from aqueous solution comprising pea flour:
  i) at a pH of about 7 to about 10,
  ii) at a temperature of about 18° C. to 60° C.,
  iii) for about 30 to 60 minutes for extraction,
  iv) using Na, Ca, or Mg salt or combination thereof,
b) separation of solids from the aqueous solution, producing a liquid fraction,
c) precipitation of protein comprising:
  heating the liquid fraction from step b) at a temperature of about 55° C. to 75° C. for about 30 to 60 minutes before the precipitation, and
  c-1) precipitating protein at pH 7 to 8 with Na, Ca, or Mg salt or combination thereof; and then
  c-2) precipitating the remaining fraction of the protein at pH 4 to 5 with Na, Ca, or Mg salt or combination thereof,
d) washing protein isolate from step c), e) creating a protein slurry of the albumin enriched PPI, f) dilution of protein slurry, g) homogenization and sterilization of protein slurry, and h) drying protein slurry, thereby producing albumin enriched PPI.

In some aspects, the present disclosure provides an albumin enriched pea protein isolate (PPI) extraction process comprising:
a) protein extraction from aqueous solution comprising pea flour:
  i) at a pH of about 7 to about 10,
  ii) at a temperature of about 18° C. to 60° C.,
  iii) for about 30 to 60 minutes for extraction,
  iv) using Na, Ca, or Mg salt or combination thereof,
b) separation of solids from the aqueous solution, producing a liquid fraction,
c) precipitation of protein comprising:
  precipitating protein at a pH about 4 to 8, at a temperature of about 18° C. to 95° C. for about 5 to 60 minutes,
d) washing protein isolate from step d), e) creating a protein slurry of the albumin enriched PPI, f) dilution of protein slurry, g) homogenization and sterilization of protein slurry, and h) drying protein slurry, thereby producing albumin enriched PPI.

In other aspects, the present disclosure provides a pea protein isolate (PPI) extraction process comprising:
a) protein extraction from aqueous solution comprising pea flour:
  i) at a pH of about 7 to about 10,
  ii) at a temperature of about 18° C. to 60° C.,
  iii) for about 30 to 60 minutes for extraction,
  iv) using Na, Ca, or Mg salt or combination thereof,
b) separation of solids from the aqueous solution, producing a liquid fraction,
c) precipitation of protein comprising:
  c-1) precipitating protein at pH 7 to 8; and then
  c-2) precipitating the remaining fraction of the protein at pH 4 to 5,
d) washing protein isolate from step c), e) creating a protein slurry of the albumin enriched PPI, f) dilution of protein slurry, g) homogenization and sterilization of protein slurry, and h) drying protein slurry, thereby producing albumin enriched PPI.

In other aspects, the present disclosure provides a pea protein isolate (PPI) extraction process comprising:
a) protein extraction from aqueous solution comprising pea flour:
  i) at a pH of about 7 to about 10,
  ii) at a temperature of about 18° C. to 60° C.,
  iii) for about 30 to 60 minutes for extraction,
  iv) using Na, Ca, or Mg salt or combination thereof,
b) separation of solids from the aqueous solution, producing a liquid fraction,
c) precipitation of protein comprising:
  i) heating the liquid fraction from step b) at a temperature of about 55° C. to 75° C. for about 30 to 60 minutes before the precipitation, ii) precipitating protein at a pH about 4 to 8, at a temperature of about 18° C. to 95° C. for about 5 to 60 minutes,
d) washing protein isolate from step d), e) creating a protein slurry of the albumin enriched PPI, f) dilution of protein slurry, g) homogenization and sterilization of protein slurry, and h) drying protein slurry, thereby producing albumin enriched PPI.

In yet other aspects, the present disclosure provides a pea protein isolate (PPI) extraction process comprising:
a) protein extraction from aqueous solution comprising pea flour:
  i) at a pH of about 7 to about 10,
  ii) at a temperature of about 18° C. to 60° C.,
  iii) for about 30 to 60 minutes for extraction,
  iv) using Na, Ca, or Mg salt or combination thereof,
b) separation of solids from the aqueous solution, producing a liquid fraction,
c) precipitation of protein comprising:
  heating the liquid fraction from step b) at a temperature of about 55° C. to 75° C. for about 30 to 60 minutes before the precipitation, and
  c-1) precipitating protein at pH 7 to 8; and then
  c-2) precipitating the remaining fraction of the protein at pH 4 to 5,
d) washing protein isolate from step c), e) creating a protein slurry of the albumin enriched PPI, f) dilution of protein slurry, g) homogenization and sterilization of protein slurry, and h) drying protein slurry, thereby producing albumin enriched PPI.

Pea Protein Isolates (PPI) and Legume Protein Isolates (LPI)

In addition to the extraction process of albumin enriched PPIs, the present disclosure provides albumin enriched PPIs produced by such processes of the present disclosure and albumin enriched PPIs having particular useful characteristics. The albumin enriched PPI extraction process is described in the section "Pea Protein Isolate Extraction Process" above. The pea protein isolates also referred to herein as PPI.

In addition to the extraction process of albumin enriched LPIs, the present disclosure provides albumin enriched LPIs produced by such processes of the present disclosure and albumin enriched LPIs having particular useful characteristics. The albumin enriched LPI extraction process is described in the section "Legume Protein Isolate Extraction Process" above. The legume protein isolates also referred to herein as LPI.

In some embodiments, the pea protein isolate produced by the above process is albumin rich pea protein isolate. In some embodiments, the albumin enriched PPI produced by the above process has a protein content in the range of about 80 to about 90 wt % (Nx6.25) on a dry basis. In other embodiments, the albumin enriched PPI has protein content in the range of about 80% to about 95% on a dry basis. In yet other embodiments, the albumin enriched PPI has protein content in the range of about 80% to about 99% on a dry basis. The process allows for the protein of the albumin enriched PPIs to substantially maintain its native form.

In some embodiments, the legume protein isolate produced by the above process is albumin rich legume protein isolate. In some embodiments, the albumin enriched LPI produced by the above process has a protein content in the range of about 80 to about 90 wt % (Nx6.25) on a dry basis. In other embodiments, the albumin enriched LPI has protein content in the range of about 80% to about 95% on a dry basis. In yet other embodiments, the albumin enriched LPI has protein content in the range of about 80% to about 99% on a dry basis. The process allows for the protein of the albumin enriched LPIs to substantially maintain its native form.

In some embodiments, the albumin enriched PPI produced by the above process has a unique composition associated with the enhanced albumin content in the final pea protein isolate. In still other embodiments, the albumin enriched PPI comprises about 10 wt % to about 30 wt % albumin on a dry basis. In certain embodiments, the albumin enriched PPI comprises about 5 wt % to about 30 wt % albumin on a dry basis. In other embodiments, the albumin enriched PPI comprises about 5 wt % to about 25 wt % albumin on a dry basis.

In some embodiments, the albumin enriched LPI produced by the above process has a unique composition associated with the enhanced albumin content in the final legume protein isolate. In still other embodiments, the albumin enriched LPI comprises about 10 wt % to about 30 wt % albumin on a dry basis. In certain embodiments, the albumin enriched LPI comprises about 5 wt % to about 30 wt % albumin on a dry basis. In other embodiments, the albumin enriched LPI comprises about 5 wt % to about 25 wt % albumin on a dry basis.

The albumin enriched PPI produced by the methods disclosed herein may contain a range of different amounts of the total amount of albumin present in the pea flour that the albumin enriched PPI is produced from. For instance, the amount of albumin may be from about 5% to about 60%, about 5% to about 55%, about 5% to about 50%, about 5% to about 45%, about 5% to about 40%, about 5% to about 35%, about 5% to about 30%, about 5% to about 25%, about 5% to about 20%, about 5% to about 15%, 10% to about 60%, about 10% to about 55%, about 10% to about 50%, about 10% to about 45%, about 10% to about 40%, about 10% to about 35%, about 10% to about 30%, about 10% to about 25%, about 10% to about 20%, about 10% to about 15%, 15% to about 60%, about 15% to about 55%, about 15% to about 50%, about 15% to about 45%, about 15% to about 40%, about 15% to about 35%, about 15% to about 30%, about 15% to about 25%, about 15% to about 20%, 20% to about 60%, about 20% to about 55%, about 20% to about 50%, about 20% to about 45%, about 20% to about 40%, about 20% to about 35%, about 20% to about 30%, about 20% to about 25% of the total albumin contained in the pea flour that the albumin enriched PPI is derived from. In some embodiments, the albumin enriched PPI contains at least about 5%, at least about 10%, at least about 15%, at least about 20%, at least about 25%, at least about 30%, at least about 35%, at least about 40%, at least about 45%, at least about 50%, at least about 55%, or at least about 60% of the total albumin in the pea flour that the albumin enriched PPI is derived from. In some embodiments, the albumin enriched PPI has about 10% to about 50% of the total protein present in the pea flour that the PPI is derived from.

The albumin enriched LPI produced by the methods disclosed herein may contain a range of different amounts of the total amount of albumin present in the legume flour that the albumin enriched LPI is produced from. For instance, the amount of albumin may be from about 5% to about 60%, about 5% to about 55%, about 5% to about 50%, about 5% to about 45%, about 5% to about 40%, about 5% to about 35%, about 5% to about 30%, about 5% to about 25%, about 5% to about 20%, about 5% to about 15%, 10% to about 60%, about 10% to about 55%, about 10% to about 50%, about 10% to about 45%, about 10% to about 40%, about 10% to about 35%, about 10% to about 30%, about 10% to about 25%, about 10% to about 20%, about 10% to about 15%, 15% to about 60%, about 15% to about 55%, about 15% to about 50%, about 15% to about 45%, about 15% to about 40%, about 15% to about 35%, about 15% to about 30%, about 15% to about 25%, about 15% to about 20%, 20% to about 60%, about 20% to about 55%, about 20% to about 50%, about 20% to about 45%, about 20% to about 40%, about 20% to about 35%, about 20% to about 30%, about 20% to about 25% of the total albumin contained in the pea flour that the albumin enriched PPI is derived from. In some embodiments, the albumin enriched LPI contains at least about 5%, at least about 10%, at least about 15%, at least about 20%, at least about 25%, at least about 30%, at least about 35%, at least about 40%, at least about 45%, at least about 50%, at least about 55%, or at least about 60% of the total albumin in the legume flour that the albumin enriched LPI is derived from In some embodiments, the albumin enriched LPI has about 10% to about 50% of the total protein present in the legume flour that the LPI is derived from.

In some embodiments, the albumin enriched PPI produced by the above process has unique functionality associated with the enhanced albumin content in the final pea protein isolate. Such improved functionality may be, but is not limited to, improved foaming ability, improved emulsify ability, improved gelling ability, and improved ability to stay soluble at acidic pHs.

The albumin enriched PPI produced by the above process has a range of different minimum gelling concentrations. For instance, the minimum gelling concentration may be at least about 5% to at least about 15%, at least about 5% to at least about 14%, at least about 5% to at least about 13%, at least about 5% to at least about 12%, at least about 5% to at least about 11%, at least about 5% to at least about 10%, least about 6% to at least about 15%, at least about 6% to at least about 14%, at least about 6% to at least about 13%, at least about 6% to at least about 12%, at least about 6% to at least about 11%, at least about 6% to at least about 10%, least about 7% to at least about 15%, at least about 7% to at least about 14%, at least about 7% to at least about 13%, at least about 7% to at least about 12%, at least about 7% to at least about 11%, at least about 7% to at least about 10%, least about 8% to at least about 15%, at least about 8% to at least about 14%, at least about 8% to at least about 13%, at least about 8% to at least about 12%, at least about 8% to at least about 11%, at least about 8% to at least about 10%, least about 9% to at least about 15%, at least about 9% to at least about 14%, at least about 9% to at least about 13%, at least about 9% to at least about 12%, least about 10% to at least about 15%, at least about 10% to at least about 14%, at least about 10% to at least about 13%, or at least about 10% to at least about 12% protein concentration. In some embodiments, the albumin enriched PPI has a minimum gelling concentration of at least about 15%, at least about 14%, at least about 13%, at least about 12%, at least about 11%, at least about 10%, at least about 9%, at least about 8%, at least about 7%, at least about 6%, or at least about 5%. In some embodiments, the albumin enriched PPI has a minimum gelling concentration from at least about 5% to at least about 15% protein concentration.

In some embodiments, the albumin enriched LPI produced by the above process has unique functionality associated with the enhanced albumin content in the final legume protein isolate. Such improved functionality may be, but is not limited to, improved foaming ability, improved emulsify ability, improved gelling ability, and improved ability to stay soluble at acidic pHs.

The albumin enriched LPI produced by the above process has a range of different minimum gelling concentrations. For instance, the minimum gelling concentration may be at least about 5% to at least about 15%, at least about 5% to at least about 14%, at least about 5% to at least about 13%, at least about 5% to at least about 12%, at least about 5% to at least about 11%, at least about 5% to at least about 10%, least about 6% to at least about 15%, at least about 6% to at least about 14%, at least about 6% to at least about 13%, at least about 6% to at least about 12%, at least about 6% to at least about 11%, at least about 6% to at least about 10%, least about 7% to at least about 15%, at least about 7% to at least about 14%, at least about 7% to at least about 13%, at least about 7% to at least about 12%, at least about 7% to at least about 11%, at least about 7% to at least about 10%, least about 8% to at least about 15%, at least about 8% to at least about 14%, at least about 8% to at least about 13%, at least about 8% to at least about 12%, at least about 8% to at least about 11%, at least about 8% to at least about 10%, least about 9% to at least about 15%, at least about 9% to at least about 14%, at least about 9% to at least about 13%, at least about 9% to at least about 12%, least about 10% to at least about 15%, at least about 10% to at least about 14%, at least about 10% to at least about 13%, or at least about 10% to at least about 12%. In some embodiments, the albumin enriched PPI has a minimum gelling concentration of at least about 15%, at least about 14%, at least about 13%, at least about 12%, at least about 11%, at least about 10%, at least about 9%, at least about 8%, at least about 7%, at least about 6%, or at least about 5%. In some embodiments, the albumin enriched LPI has a minimum gelling concentration from at least about 5% to at least about 15%.

In some embodiments, the albumin enriched PPI contains, but is not limited to, globulin, legumin, vicilin, convicilin, albumin, PA-1 albumin, PA-II albumin, lectins, prolamin, glutelin.

In some embodiments, the albumin enriched LPI contains, but is not limited to, globulin, legumin, vicilin, convicilin, albumin, PA-1 albumin, PA-II albumin, lectins, prolamin, glutelin.

In some embodiments, the albumin enriched PPI comprises PS-1 albumin and PS-II albumin. In certain embodiments, the ratio of PS-1 albumin to PS-II albumin is in the range of 4:1, 3:1, 2:1, 1:1, 1:2, 1:3, or 1:4.

In some embodiments, the albumin enriched LPI comprises PS-1 albumin and PS-II albumin. In certain embodiments, the ratio of PS-1 albumin to PS-II albumin is in the range of 4:1, 3:1, 2:1, 1:1, 1:2, 1:3, or 1:4.

In some embodiments, the albumin enriched PPI has protein solubility improved by at least 50% as compared with conventional PPI with less albumin. In certain embodiments, the albumin enriched PPI has protein solubility improved by at least 50%, 55%, 60%, 65%, 70%, 75%, 80%, 85%, 90% as compared with conventional PPI with less albumin.

The albumin enriched PPI of the present disclosure may have a range of different solubilities in water. For instance, the albumin enriched PPI may have at least about 50% to at least about 100%, at least about 50% to at least about 95%, at least about 50% to at least about 90%, at least about 50% to at least about 85%, at least about 50% to at least about 80%, at least about 50% to at least about 75%, at least about 50% to at least about 70%, at least about 50% to at least about 65%, at least about 50% to at least about 60%, at least about 55% to at least about 100%, at least about 55% to at least about 95%, at least about 55% to at least about 90%, at least about 55% to at least about 85%, at least about 55% to at least about 80%, at least about 55% to at least about 75%, at least about 55% to at least about 70%, at least about 55% to at least about 65%, at least about 60% to at least about 100%, at least about 60% to at least about 95%, at least about 60% to at least about 90%, at least about 60% to at least about 85%, at least about 60% to at least about 80%, at least about 60% to at least about 75%, at least about 60% to at least about 70%, at least about 65% to at least about 100%, at least about 65% to at least about 95%, at least about 65% to at least about 90%, at least about 65% to at least about 85%, at least about 65% to at least about 80%, at least about 65% to at least about 75%, at least about 70% to at least about 100%, at least about 70% to at least about 95%, at least about 70% to at least about 90%, at least about 70% to at least about 85%, at least about 70% to at least about 80%, at least about 75% to at least about 100%, at least about 75% to at least about 95%, at least about 75% to at least about 90%, at least about 75% to at least about 85%, at least about 80% to at least about 100%, at least about 80% to at least about 95%, or at least about 80% to at least about 90% solubility in water. In some embodiments, the albumin enriched PPI has at least about 60% to at least about 95% solubility in water.

In some embodiments, the albumin enriched LPI has protein solubility improved by at least 50% as compared with conventional LPI with less albumin. In certain embodiments, the albumin enriched LPI has protein solubility improved by at least 50%, 55%, 60%, 65%, 70%, 75%, 80%, 85%, 90% as compared with conventional LPI with less albumin.

The albumin enriched LPI of the present disclosure may have a range of different solubilities in water. For instance, the albumin enriched LPI may have at least about 50% to at least about 100%, at least about 50% to at least about 95%, at least about 50% to at least about 90%, at least about 50% to at least about 85%, at least about 50% to at least about 80%, at least about 50% to at least about 75%, at least about 50% to at least about 70%, at least about 50% to at least about 65%, at least about 50% to at least about 60%, at least about 55% to at least about 100%, at least about 55% to at least about 95%, at least about 55% to at least about 90%, at least about 55% to at least about 85%, at least about 55% to at least about 80%, at least about 55% to at least about 75%, at least about 55% to at least about 70%, at least about 55% to at least about 65%, at least about 60% to at least about 100%, at least about 60% to at least about 95%, at least about 60% to at least about 90%, at least about 60% to at least about 85%, at least about 60% to at least about 80%, at least about 60% to at least about 75%, at least about 60% to at least about 70%, at least about 65% to at least about 100%, at least about 65% to at least about 95%, at least about 65% to at least about 90%, at least about 65% to at least about 85%, at least about 65% to at least about 80%, at least about 65% to at least about 75%, at least about 70% to at least about 100%, at least about 70% to at least about 95%, at least about 70% to at least about 90%, at least about 70% to at least about 85%, at least about 70% to at least about 80%, at least about 75% to at least about 100%, at least about 75% to at least about 95%, at least about 75% to at least about 90%, at least about 75% to at least about 85%, at least about 80% to at least about 100%, at least about 80% to at least about 95%, or at least about 80% to at least about 90% solubility in water. In some embodiments, the albumin enriched LPI has at least about 60% to at least about 95% solubility in water.

In other embodiments, the albumin enriched PPI has protein heat stability improved by at least 50% as compared with conventional PPI with less albumin. In certain embodiments, the albumin enriched PPI has protein heat stability improved by at least 50%, 55%, 60%, 65%, 70%, 75%, 80%, 85%, 90% as compared with conventional PPI with less albumin.

In other embodiments, the albumin enriched LPI has protein heat stability improved by at least 50% as compared with conventional LPI with less albumin. In certain embodiments, the albumin enriched LPI has protein heat stability improved by at least 50%, 55%, 60%, 65%, 70%, 75%, 80%, 85%, 90% as compared with conventional LPI with less albumin.

In still other embodiments, the albumin enriched PPI has improved protein yield by about 8 to about 10% as compared with conventional PPI with less albumin.

In still other embodiments, the albumin enriched LPI has improved protein yield by about 8 to about 10% as compared with conventional LPI with less albumin.

Use of the Pea Protein Isolates (PPI) and Legume Protein Isolates (LPI)

In some aspects, the present disclosure further provides use of the albumin enriched PPI of the present disclosure in the production of a foam. In some aspects, the present disclosure further provides use of the albumin enriched LPI of the present disclosure in the production of a foam.

In other aspects, the present invention provides use of the albumin enriched PPI of the present disclosure in the production of a gel. In other aspects, the present invention provides use of the albumin enriched LPI of the present disclosure in the production of a gel.

In still other aspects, the present invention provides use of the albumin enriched PPI of the present disclosure in the production of an emulsion. In other aspects, the present invention provides use of the albumin enriched LPI in the production of an emulsion. In some embodiments, the emulsion is made from a mixture of equal parts oil and water.

In some aspects, the present disclosure provides a foam comprising the albumin enriched PPI of the present disclosure. In some aspects, the present disclosure provides a foam comprising the albumin enriched LPI of the present disclosure.

In other aspects, the present disclosure provides a gel comprising the albumin enriched PPI. In other aspects, the present disclosure provides a gel comprising the albumin enriched LPI.

In still other aspects, the present disclosure provides an emulsion comprising the albumin enriched PPI of the present disclosure. In still other aspects, the present disclosure provides an emulsion comprising the albumin enriched LPI of the present disclosure.

In some aspects, the present disclosure provides use of the albumin enriched PPI of the present disclosure in a food or beverage application. In some aspects, the present disclosure provides use of the albumin enriched LPI of the present disclosure in a food or beverage application. In some embodiments, the food or beverage application is selected from milk shake, protein bars, meat analogues, confectionary, condiments, mayonnaise, salad dressing, nutritional supplements and diary alternatives. In certain embodiments, the dairy alternative is selected from creamers, ice cream, yogurt, buttermilk and cheese.

In yet other aspects, the present disclosure provides a food or beverage comprising the albumin enriched PPI of the present disclosure. In yet other aspects, the present disclosure provides a food or beverage comprising the albumin enriched LPI of the present disclosure.

EXEMPLARY NON-LIMITING ASPECTS OF THE DISCLOSURE

Aspects, including embodiments, of the present subject matter described above may be beneficial alone or in combination, with one or more other aspects or embodiments. Without limiting the foregoing description, certain non-limiting aspects of the disclosure numbered 1-78 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below:

Aspect 1. An albumin enriched pea protein isolate (PPI) extraction process comprising:
a) protein extraction from aqueous solution comprising pea flour:
  i) at a pH of about 7 to 10,
  ii) at a temperature of about 18° C. to 60° C.,
  iii) for about 30 to 60 minutes for extraction,
b) separation of solids from the aqueous solution, producing a liquid fraction,
c) precipitation of protein comprising:
  i) precipitating protein at a pH about 4 to 8, at a temperature of about 18° C. to 95° C. for about 5 to 60 minutes,
  ii) using Na, Ca, or Mg salt or combination thereof,
thereby producing an albumin enriched PPI.

Aspect 2. The process of Aspect 1, the precipitation of protein of step c) comprises:
c-1) precipitating protein at pH 7 to 8 with Na, Ca, or Mg salt or combination thereof; and then
c-2) precipitating the remaining fraction of the protein at pH 4 to 5 with Na, Ca, or Mg salt or combination thereof.

Aspect 3. The process of Aspect 1, the protein extraction of step a) comprises using Na, Ca, or Mg salt or a combination thereof.

Aspect 4. The process of Aspect 1, wherein the precipitation of step c) comprises heating the liquid fraction from step b) at a temperature of about 55° C. to 75° C. for about 30 to 60 minutes before the precipitation.

Aspect 5. The process of Aspect 4, wherein the heating the liquid fraction from step b) comprises optionally using Na, Ca, or Mg salt or a combination thereof.

Aspect 6. The process of any one of Aspects 1 to 5, wherein the Na, Ca, or Mg salt or a combination thereof is about 0.5 to 5% concentration.

Aspect 7. The process of any one of Aspects 1 to 6, wherein the Na, Ca, or Mg salt in step a) and step c) is selected from NaCl, $CaCl_2$, $MgCl_2$, Sodium hexametaphosphate (SHMP), sodium triphosphate (STP), calcium perchlorate, $CaPOCl_3$, sodium sulfite, sodium bisulfite, sodium thiocyanate and calcium thiocyanate.

Aspect 8. The process of any one of Aspects 1 to 6, wherein for at least one of step a) and step c), the Na, Ca, or Mg salt is SHMP.

Aspect 9. The process of any one of Aspects 1 to 6, wherein for at least one of step a) and step c), the Na, Ca, or Mg salt is STP.

Aspect 10. The process of any one of Aspects 1 to 6, wherein for at least one of step a) and step c), the Na, Ca, or Mg salt is calcium perchlorate.

Aspect 11. The process of any one of Aspects 1 to 6, wherein for at least one of step a) and step c), the Na, Ca, or Mg salt is $CaPOCl_3$.

Aspect 12. The process of Aspect 1, wherein the protein extraction of step a) is performed at pH about 7 to about 9.5.

Aspect 13. The process of Aspect 1, wherein the solids of step b) are starch and fiber and the liquid fraction of step b) comprises protein supernatant, vitamins, and minerals.

Aspect 14. The process of Aspect 1, wherein the separation of step b) is performed by centrifugation.

Aspect 15. The process of Aspect 14, wherein the centrifugation is performed at 5000 g for about 10 minutes at room temperature.

Aspect 16. The process of Aspect 14, wherein the centrifugation is performed at 15000 g for about 30 minutes at 4° C.

Aspect 17. The process of Aspect 1, wherein the precipitation of step c) is performed at pH about 4 to about 7.

Aspect 18. The process of Aspect 1, wherein the precipitation of step c) is performed at temperature of about 50 to 60° C.

Aspect 19. The process of any one of Aspects 1 to 18, further comprising:
d) washing the albumin enriched PPI from step c).

Aspect 20. The process of Aspect 19, further comprising:
e) creating a protein slurry of the albumin enriched PPI.

Aspect 21. The process of Aspect 20, further comprising:
f) dilution of the protein slurry.

Aspect 22. The process of Aspect 21, further comprising:
g) homogenization and sterilization of the protein slurry.

Aspect 23. The process of Aspect 22, further comprising:
h) drying the protein slurry.

Aspect 24. The process of Aspect 19, wherein the washing of step d) is performed with water at the precipitation pHs.

Aspect 25. The process of Aspect 20, wherein the creating a protein slurry of step e) is performed using water.

Aspect 26. The process of Aspect 21, wherein the dilution of step f) is performed with water and adjusted to about pH 7.

Aspect 27. The process of Aspect 22, wherein the homogenization of step g) is homogenizing the protein slurry by using a high-pressure homogenizer.

Aspect 28. The process of Aspect 22, wherein the sterilization of step g) is sterilizing the protein slurry in a direct steam injection.

Aspect 29. The process of Aspect 28, wherein the sterilization of step g) is performed at a temperature of about 75 to about 140° C. for about 2 seconds to about 10 minutes.

Aspect 30. The process of Aspect 23, wherein the drying the protein slurry of step h) is performed by a freeze drying or spray drying.

Aspect 31. An albumin enriched pea protein isolate (PPI) extraction process comprising:
a) protein extraction from aqueous solution comprising peas:
  i) at a pH of about 7 to 10,
  ii) at a temperature of about 18° C. to 60° C.,
  iii) for about 30 to 60 minutes for extraction,
  iv) using Na, Ca, or Mg salt or combination thereof b) separation of solids from the aqueous solution, producing a liquid fraction,
c) precipitation of protein comprising:
   precipitating protein at a pH about 4 to 8, at a temperature of about 18° C. to 95° C. for about 5 to 60 minutes,
thereby producing an albumin enriched PPI.

Aspect 32. The process of Aspect 31, the precipitation of protein of step c) comprises:
c-1) precipitating protein at pH 7 to 8 with Na, Ca, or Mg salt or combination thereof; and then
c-2) precipitating the remaining fraction of the protein at pH 4 to 5 with Na, Ca, or Mg salt or combination thereof.

Aspect 33. The process of Aspect 31, wherein the precipitation of step c) comprises heating the liquid fraction from step b) at a temperature of about 55° C. to 75° C. for about 30 to 60 minutes before the precipitation.

Aspect 34. The process of Aspect 33, wherein the heating the liquid fraction from step b) comprises optionally using Na, Ca, or Mg salt or a combination thereof.

Aspect 35. The process of any one of Aspects 31 to 34, wherein the Na, Ca, or Mg salt or a combination thereof is about 0.5 to 5% concentration.

Aspect 36. The process of any one of Aspects 31 to 35, wherein the Na, Ca, or Mg salt is selected from NaCl, $CaCl_2$, $MgCl_2$, Sodium hexametaphosphate (SHMP), sodium triphosphate (STP), calcium perchlorate, $CaPOCl_3$, sodium sulfite, sodium bisulfite, sodium thiocyanate and calcium thiocyanate.

Aspect 37. The process of any one of Aspects 31 to 35, wherein for at least one of step a) and step c), the Na, Ca, or Mg salt is SHMP.

Aspect 38. The process of any one of Aspects 31 to 35, wherein for at least one of step a) and step c), the Na, Ca, or Mg salt is STP.

Aspect 39. The process of any one of Aspects 31 to 35, wherein for at least one of step a) and step c), the Na, Ca, or Mg salt is calcium perchlorate.

Aspect 40. The process of any one of Aspects 31 to 35, wherein for at least one of step a) and step c), the Na, Ca, or Mg salt is $CaPOCl_3$.

Aspect 41. The process of Aspect 31, wherein the protein extraction of step a) is performed at pH about 7 to about 9.5.

Aspect 42. The process of Aspect 31, wherein the solids of step b) are starch and fiber and the liquid fraction of step b) comprises protein supernatant, vitamins, and minerals.

Aspect 43. The process of Aspect 31, wherein the separation of step b) is performed by centrifugation.

Aspect 44. The process of Aspect 44, wherein the centrifugation is performed at 5000 g for about 10 minutes at room temperature.

Aspect 45. The process of Aspect 44, wherein the centrifugation is performed at 15000 g for about 30 minutes at 4° C.

Aspect 46. The process of Aspect 31, wherein the precipitation of step c) is performed at pH about 4 to about 7.

Aspect 47. The process of Aspect 31, wherein the precipitation of step c) is performed at temperature of about 50 to 60° C.

Aspect 48. The process of any one of Aspects 31 to 47, further comprising:
d) washing the albumin enriched PPI from step c).

Aspect 49. The process of Aspect 48, further comprising:
e) creating a protein slurry of the albumin enriched PPI.

Aspect 50. The process of Aspect 49, further comprising:
f) dilution of the protein slurry.

Aspect 51. The process of Aspect 50, further comprising:
g) homogenization and sterilization of the protein slurry.

Aspect 52. The process of Aspect 51, further comprising:
h) drying the protein slurry.

Aspect 53. The process of Aspect 48, wherein the washing of step d) is performed with water at the precipitation pHs.

Aspect 54. The process of Aspect 49, wherein the creating a protein slurry of step e) is performed using water.

Aspect 55. The process of Aspect 50, wherein the dilution of step f) is performed with water and adjusted to about pH 7.

Aspect 56. The process of Aspect 51, wherein the homogenization of step g) is homogenizing the protein slurry by using a high-pressure homogenizer.

Aspect 57. The process of Aspect 51, wherein the sterilization of step g) is sterilizing the protein slurry in a direct steam injection.

Aspect 58. The process of Aspect 57, wherein the sterilization of step g) is performed at a temperature of about 75 to 140° C. for about 2 seconds to 10 minutes.

Aspect 59. The process of Aspect 52, wherein the drying the protein slurry of step h) is performed by a freeze drying or spray drying.

Aspect 60. An albumin enriched PPI produced by the process of any of Aspects 1-59.

Aspect 61. The albumin enriched PPI of Aspect 60, wherein the albumin enriched PPI has a protein content in the range of about 80 to about 95 wt % (Nx6.25) on a dry basis.

Aspect 62. The albumin enriched PPI of Aspect 60 or 61, wherein the albumin enriched PPI comprises PS-1 albumin and PS-II albumin.

Aspect 63. The albumin enriched PPI of any one of Aspects 60 to 62, wherein the albumin enriched PPI comprises about 10 to about 30% albumin.

Aspect 64. The albumin enriched PPI of any one of Aspects 60 to 63, wherein the albumin enriched PPI has protein solubility improved by at least 50% as compared with a conventional PPI.

Aspect 65. The albumin enriched PPI of any one of Aspects 60 to 64, wherein the albumin enriched PPI has protein heat stability improved by at least 50% as compared with a conventional PPI.

Aspect 66. The albumin enriched PPI of any one of Aspects 60 to 65, wherein the albumin enriched PPI has improved protein yield by about 8 to about 10% as compared with a conventional PPI.

Aspect 67. The albumin enriched PPI of any one of Aspects 60 to 66, wherein the albumin enriched PPI is substantially in its native form.

Aspect 68. Use of the albumin enriched PPI of any of Aspects 60 to 67 in the production of a foam.

Aspect 69. Use of the albumin enriched PPI of any of Aspects 60 to 67 in the production of a gel.

Aspect 70. Use of the albumin enriched PPI of any of Aspects 60 to 67 in the production of an emulsion.

Aspect 71. The use of Aspect 70, wherein the emulsion is made from a mixture of equal parts oil and water.

Aspect 72. A foam comprising the albumin enriched PPI of any of Aspects 60 to 67.

Aspect 73. A gel comprising the albumin enriched PPI of any of Aspects 60 to 67.

Aspect 74. An emulsion comprising the albumin enriched PPI of any of Aspects 60 to 67.

Aspect 75. Use of the albumin enriched PPI of any of Aspects 60 to 67 in a food or beverage application.

Aspect 76. The use of Aspect 75, wherein the food or beverage application is selected from milk shake, protein bars, meat analogues, confectionary, condiments, mayonnaise, salad dressing, nutritional supplements, and diary alternatives.

Aspect 77. The use of Aspect 76, wherein the dairy alternative is selected from creamers, ice cream, yogurt, buttermilk, and cheese.

Aspect 78. A food or beverage comprising the albumin enriched PPI of any of Aspects 60 to 67.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, temperature is in degrees Centigrade, and times are in minutes.

All publications and patent applications cited in this specification are herein incorporated by reference as if each individual publication or patent application were specifically and individually indicated to be incorporated by reference.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. All such modifications are intended to be included within the scope of the appended claims.

Example 1

Process

In this Example, the albumin enriched PPI was prepared by the utilization of SHMP in the protein precipitation step (step 3).

TABLE 1

| No. | Extraction | Process details |
|---|---|---|
| 1 | Aqueous Extraction | pH of extraction: 9.5<br>Time of extraction: 30 min<br>Temperature of extraction: 55° C. |
| 2 | Centrifugation | 5000 g for 10 minutes at room temperature<br>15000 g for 30 min at 4° C. |
| 3 | Precipitation of protein | Heating the protein supernatant from step 2 for 30 min at a temperature of 60° C.<br>Precipitation of protein at pHs 4.5 for 30 min<br>Precipitation temperature: 55° C.<br>SHMP concentration: 2% and 5% |
| 4 | Washing of protein isolate from step 3 | Washing the protein with 2x water at precipitation pHs |
| 5 | Dilution | Diluting the protein slurry with 2x water and adjust its pH to pH7 |

TABLE 1-continued

| No. | Extraction | Process details |
|---|---|---|
| 6 | Sterilization | Homogenizing the protein slurry using a high-pressure homogenizer<br>Sterilizing the protein slurry in a direct steam injection [DSI (120 and 140° C. for 6 seconds and 30 seconds)] |
| 7 | Drying | Drying the protein slurry by a freeze/spray drier |

Protein Analysis: SDS-PAGE

Figure 3:
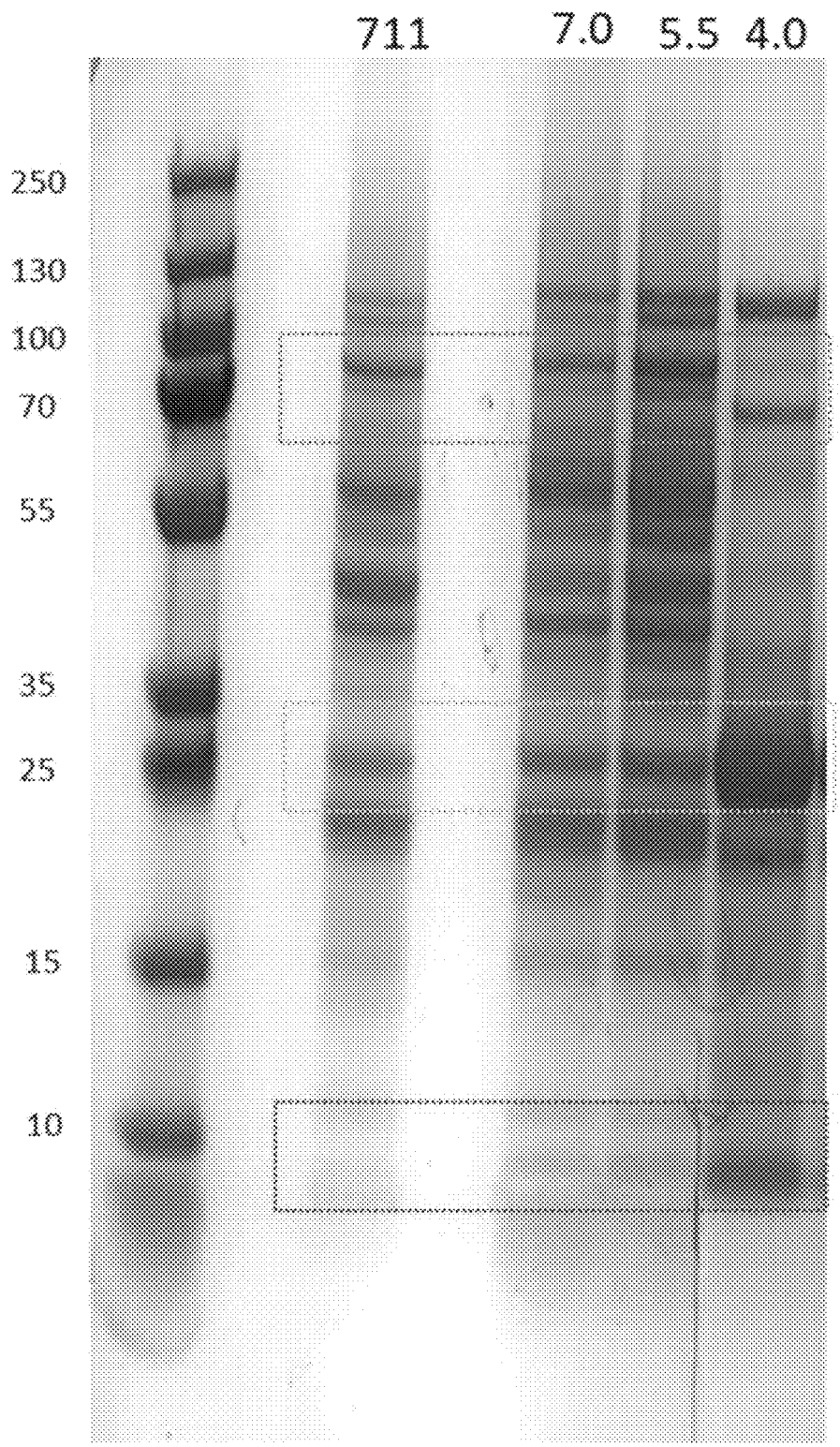
FIG. 3 shows PPI analysis results including albumin enriched PPI by use of SDS PGE.

The SDS-PAGE demonstrated increased concentration of albumin content in the PPI produced by the above process (pH4-right lane in FIG. 3) compared to conventional PPI (711 left lane in FIG. 3), indicating that the novel extraction technology enabled the precipitation of albumin.

Result

The albumin rich pea PPI has a protein content in the range of 80-95% on a dry basis and had enriched 10-30% albumin fraction that has enhanced the PPI solubility by at least 50%.

The above extraction process (by the present albumin precipitation technique) enhanced the protein yield 8-10% and enhanced the solubility in water of albumin enriched PPI to twice that of conventional PPI. Specifically, the albumin enriched PPI produced by the above process has doubled solubility compared to conventional PPI.

TABLE 2

| Sample | Protein solubility |
|---|---|
| PPI (FD) | 34% |
| Alb-PPI (FD) | 68% |
| Alb-PPI (SD) | 90% |

Protein Analysis: LapChip

The LabChip technique is used to demonstrate protein content in the PPI produced by the above process compared to conventional PPI. Furthermore, the LabChip is used for protein assays for characterizing both proteins and nucleic acids. Various proteins (e.g., albumin, globulin etc.) in the sample are analyzed and quantified rapidly by the LabChip technique. Herein, LabChip® GXII Touch™ protein characterization system may be used for the protein analysis. This LabChip® GXII Touch™ protein characterization system provides the complete solution for reproducible quantitation, molecular weight sizing and percent purity analysis of protein samples. Any LabChip technique systems or devices can be used for the protein analysis and are well known in the art.

Example 2

Process

In this Example, the albumin enriched PPI is prepared by the utilization of SHMP in the protein precipitation step (step 3). In this example, the precipitation step comprises precipitating protein at pH 7.5 and 8.5 (higher pH) with about 2% and 5% concentration of SHMP; and then further precipitating the remaining fraction of the protein at pH 3.5 and 4.5 (lower pH) with about 1%, 2% and 5% concentration of SHMP. Otherwise, the protein extraction process is done by the same process as the Example 1.

Protein Analysis: SDS-PAGE

SDS-PAGE is performed on the PPI from the above process and conventional PPI, demonstrating protein content in the PPI produced by the above process compared to conventional PPI.

Protein Analysis: LapChip

The LabChip technique is used to demonstrate protein content in the PPI produced by the above process compared to conventional PPI. Furthermore, the LabChip is used for protein assays for characterizing both proteins and nucleic acids. Various proteins (e.g., albumin, globulin etc.) in the sample are analyzed and quantified rapidly by the LabChip technique. Furthermore, the LabChip is used for protein assays for characterizing both proteins and nucleic acids. Various proteins (e.g., albumin, globulin etc.) in the sample are analyzed and quantified rapidly by the LabChip technique. Herein, LabChip® GXII Touch™ protein characterization system may be used for the protein analysis. This LabChip® GXII Touch™ protein characterization system provides the complete solution for reproducible quantitation, molecular weight sizing and percent purity analysis of protein samples. Any LabChip technique systems or devices can be used for the protein analysis and are well known in the art.

Example 3

Process

In this Example, the albumin enriched PPI is prepared by the utilization of $CaPOCl_3$ in the protein precipitation step (step 3). In this example, the precipitation step comprises precipitating protein at pH 8.5 (higher pH) with about 2% and 5% concentration of $CaPOCl_3$, then further precipitating the remaining fraction of the protein at pH 4.5 (lower pH) with about 1%, 2% and 5% concentration of SHMP. Otherwise, the protein extraction process is done by the same process as the Example 1.

Protein Analysis: SDS-PAGE

SDS-PAGE is performed on the PPI from the above process and conventional PPI, demonstrating protein content in the PPI produced by the above process compared to conventional PPI.

Protein Analysis: Lapchip

The LabChip technique is used to demonstrate protein content in the PPI produced by the above process compared to conventional PPI. Furthermore, the LabChip is used for protein assays for characterizing both proteins and nucleic acids. Various proteins (e.g., albumin, globulin etc.) in the sample are analyzed and quantified rapidly by the LabChip technique. Furthermore, the LabChip is used for protein assays for characterizing both proteins and nucleic acids. Various proteins (e.g., albumin, globulin etc.) in the sample are analyzed and quantified rapidly by the LabChip technique. Herein, LabChip® GXII Touch™ protein characterization system may be used for the protein analysis. This LabChip® GXII Touch™ protein characterization system provides the complete solution for reproducible quantitation, molecular weight sizing and percent purity analysis of protein samples. Any LabChip technique systems or devices can be used for the protein analysis and are well known in the art.

Example 4

Process

In this Example, the albumin enriched PPI is prepared by the utilization of SHMP and/or $CaPOCl_3$ into the protein extraction step (step 1) and by the utilization of SHMP and/or $CaPOCl_3$ into the protein precipitation step (step 3). In this example, the precipitation step comprises precipitating protein at pH 7 to 8 (higher pH) with about 0.5 to 5% concentration of SHMP and/or STP and/or Calcium Perchlorate and/or $POCl_3$; and then precipitating the remaining fraction of the protein at pH 4 to 5 (lower pH) with about 0.5 to 5% concentration of SHMP and/or STP and/or Calcium Perchlorate and/or $POCl_3$. Otherwise, the protein extraction process is done by the same process as the Example 1.

Protein Analysis: SDS-PAGE

SDS-PAGE is performed on the PPI from the above process and conventional PPI, demonstrating protein content in the PPI produced by the above process compared to conventional PPI.

Protein Analysis: Lapchip

The LabChip technique is used to demonstrate protein content in the PPI produced by the above process compared to conventional PPI. Furthermore, the LabChip is used for protein assays for characterizing both proteins and nucleic acids. Various proteins (e.g., albumin, globulin etc.) in the sample are analyzed and quantified rapidly by the LabChip technique. Furthermore, the LabChip is used for protein assays for characterizing both proteins and nucleic acids. Various proteins (e.g., albumin, globulin etc.) in the sample are analyzed and quantified rapidly by the LabChip technique. Herein, LabChip® GXII Touch™ protein characterization system may be used for the protein analysis. This LabChip® GXII Touch™ protein characterization system provides the complete solution for reproducible quantitation, molecular weight sizing and percent purity analysis of protein samples. Any LabChip technique systems or devices can be used for the protein analysis and are well known in the art.

Example 5

In this Example, the albumin enriched PPI was prepared by the utilization of SHMP in the protein precipitation step (step 3).

TABLE 3

| No. | Extraction | Process details |
|---|---|---|
| 1 | Aqueous and/or Salt Extraction | pH of extraction: 9.5<br>Time of extraction: 30 min<br>Temperature of extraction: 55° C.<br>Concentration: 20% solid |
| 2 | Centrifugation | 5000 g for 10 minutes at room temperature |
| 3 | Precipitation of protein | Adding 0.5% SHMP to starch light and then adjust the pH to pH 4 or 4.5<br>Precipitation of protein at pHs 4.-4.5 for 30 min.<br>Precipitation temperature: 55° C. |
| 4 | Washing of protein isolate from step 4 | Washing the protein with 2x water at precipitation pHs |
| 5 | Dilution | Diluting the protein slurry with 2x water and adjust its pH to pH7 |
| 6 | Sterilization | Homogenizing the protein slurry using high pressure homogenizer<br>Sterilizing the protein slurry in a direct steam injection [DSI (75-140° C. for 2 seconds to 10 minutes)] |
| 7 | Drying | Drying the protein slurry by a freeze/spray drier |

TABLE 4

| Process Characteristics | % Albumin co-precipitated with PPI |
|---|---|
| 2% SHMP at pH 4.5 | 12% |
| 1% SHMP at pH 4.5 | 20% |

TABLE 4-continued

| Process Characteristics | % Albumin co-precipitated with PPI |
|---|---|
| 0.5% SHMP at pH 4.5 | 24% |
| 0.5% SHMP at pH 4 | 40% |

Figure 5:
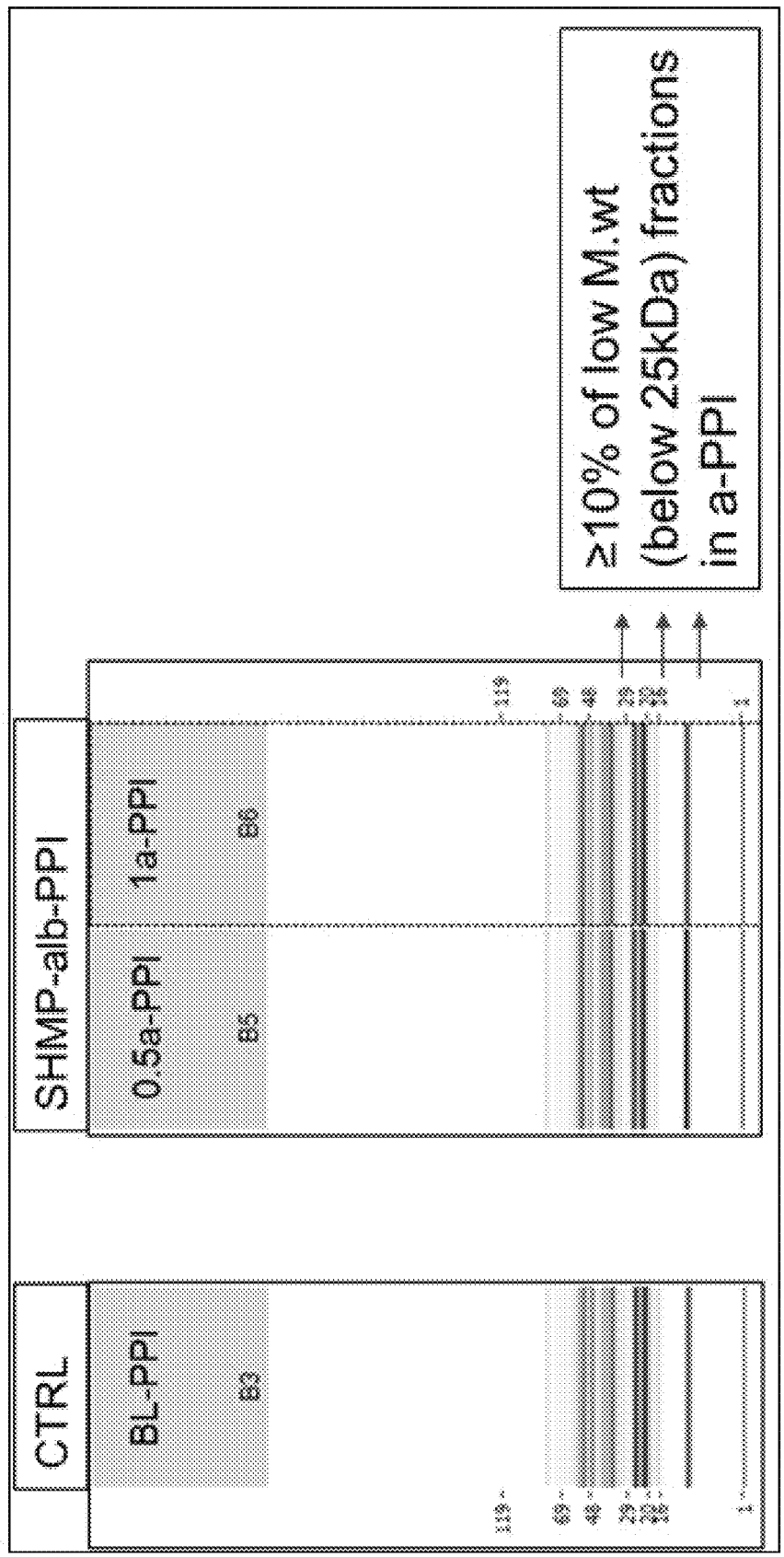
FIG. 5 shows Lab on a Chip results from a PPI produced from the conventional PPI extraction process and an albumin enriched PPI using 0.5% and 1% Sodium hexametaphosphate (SHMP).

The above table shows the percentage of albumin co-precipitated with pea protein isolate (PPI) using different concentrations of sodium hexametaphosphate (SHMP) at pH 4.5. When using 2% SHMP, 12% of the total albumin is co-precipitated with the PPI. Reducing the SHMP concentration to 1% increases the co-precipitation efficiency, resulting in 20% of the albumin being co-precipitated. Further reducing the SHMP concentration to 0.5% enhances the co-precipitation efficiency even more, resulting in 24% of the albumin being co-precipitated with the PPI. These results indicate that lower concentrations of SHMP at pH 4.5 are more effective in co-precipitating albumin with pea protein isolate, with the co-precipitation efficiency significantly increasing as the SHMP concentration decreases from 2% to 0.5%. The SDS-PAGE (FIG. 5) demonstrated increased concentration of albumin content in the PPI (pH4-right lane) compared to conventional PPI (baseline), indicating that the novel extraction technology enabled the precipitation of albumin.

Figure 6:
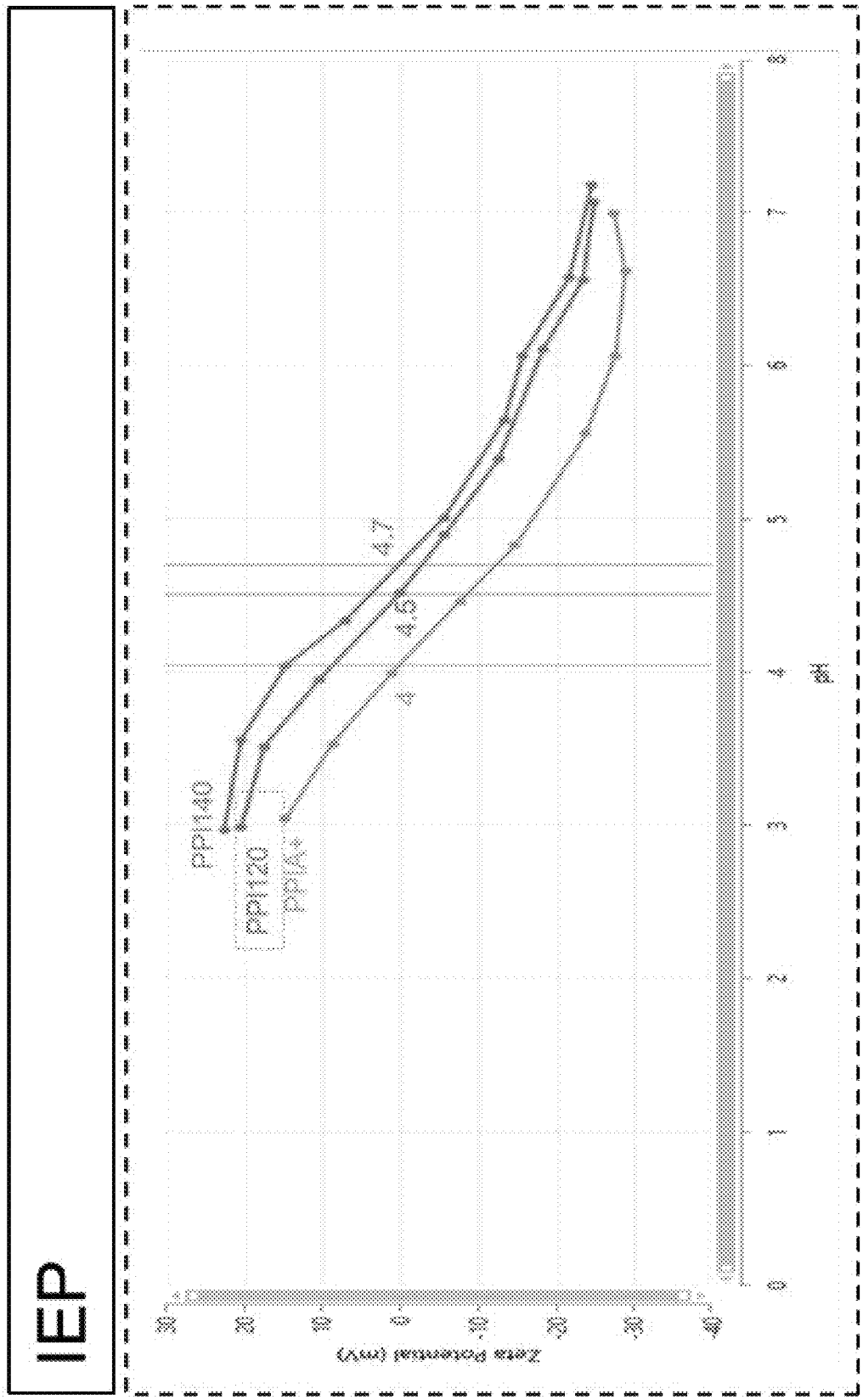
FIG. 6 shows a graph of the zeta potential of three different pea protein isolates; conventional PPI (PPI140, PPI120, and albumin enriched PPI (PPIA+)).

The gel electrophoresis image (FIG. 6) presents the protein profile analysis of pea protein isolates (PPI) and albumin-integrated pea protein isolates (alb-PPI) using sodium hexametaphosphate (SHMP). The lanes display protein bands indicating the molecular weight distribution of the proteins present in each sample. CTRL (Control): BL-PPI (Baseline Pea Protein Isolate): The control lane represents the baseline PPI without any SHMP treatment. The protein bands show the distribution of proteins at various molecular weights. SHMP-alb-PPI: 0.5a-PPI: This lane represents pea protein isolate treated with 0.5% SHMP. The protein bands are more distinct compared to the control, indicating the presence of more defined protein fractions. 1a-PPI: This lane represents pea protein isolate treated with 1% SHMP. The protein profile shows even more distinct and numerous bands, highlighting the effect of higher SHMP concentration.

Low Molecular Weight (M.wt) Fractions: The SHMP-treated samples (0.5a-PPI and 1a-PPI) have a higher proportion of low molecular weight protein fractions (below 25 kDa) compared to the control. These low M.wt fractions are indicated by the arrows pointing to the bands below the 25 kDa marker. The annotation ">10% of low M.wt (below 25 kDa) fractions in a-PPI" indicates that at least 10% of the protein content in the SHMP-treated samples consists of these low molecular weight fractions.

The gel electrophoresis results demonstrate that the use of SHMP in the extraction process significantly alters the protein profile of pea protein isolates. The SHMP treatment leads to the enrichment of low molecular weight protein fractions, which enhance the functional properties of the protein isolates. The results showed that there was 10-40% albumin in the PPI. These changes are more pronounced at higher SHMP concentrations, as seen in the 1a-PPI sample. This suggests that SHMP not only improves protein solubility and yield but also modifies the protein composition, potentially enhancing the performance of the protein isolate in various applications. Overall, the results highlight the effectiveness of SHMP in producing pea protein isolates with improved and desirable protein profiles, making them more suitable for use in food and beverage applications where specific protein functionalities are required.

Figure 7:
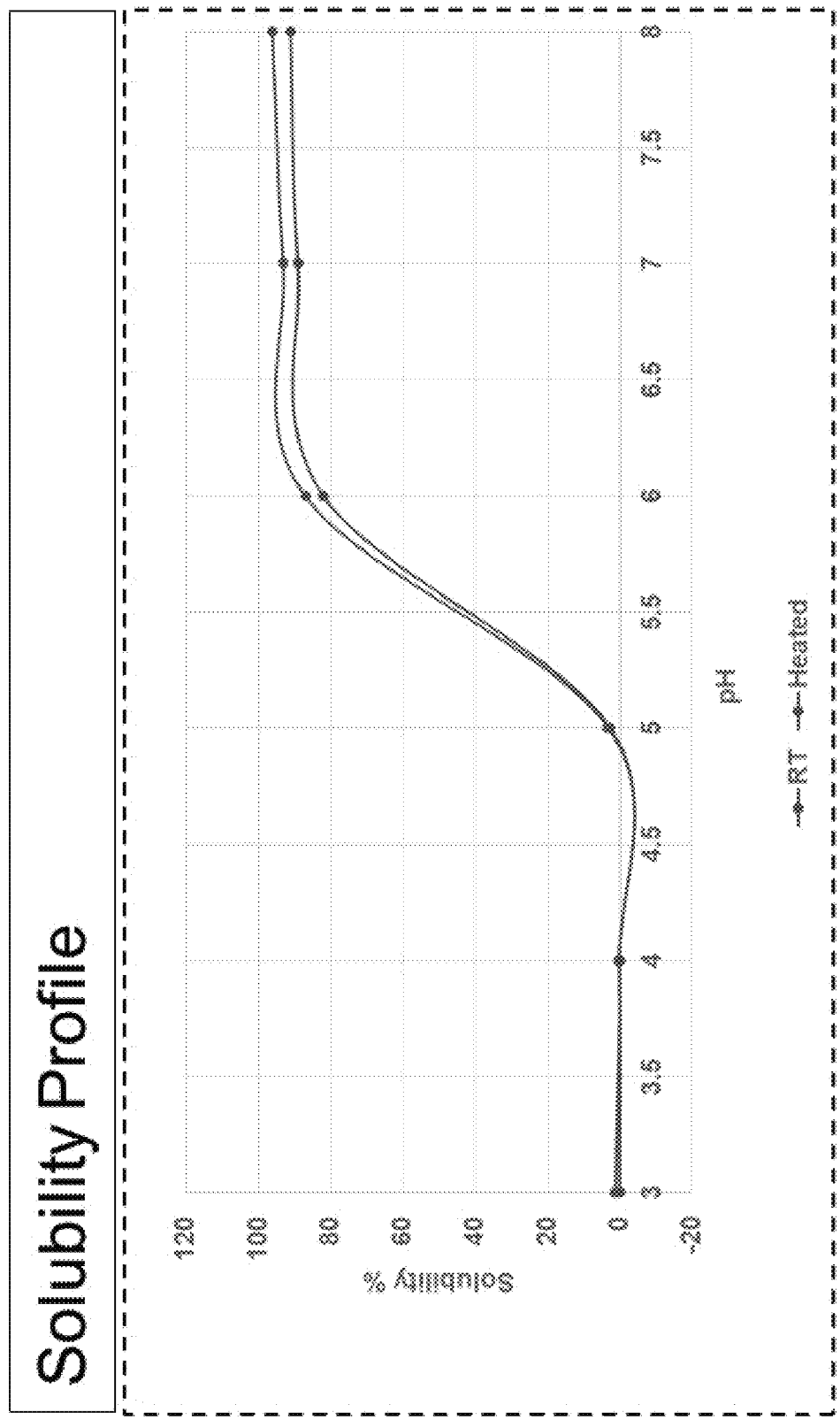
FIG. 7 shows a graph of the solubility of the albumin enriched PPI at both room temperature and heated across different pHs.

FIG. 7 displays the zeta potential measurements of three different pea protein isolates (PPI120, PPI40, and PPIA+) across a range of pH values, highlighting their electrostatic stability and behavior in acidic environments. PPI120 maintains a relatively high zeta potential at lower pH levels, gradually decreasing as the pH increases, with an isoelectric point around pH 4.5. PPI140 exhibits slightly higher zeta potential values across the pH range, with an isoelectric point around pH 4.7, indicating it has the greatest electrostatic stability. PPIA+, treated with sodium hexametaphosphate (SHMP), shows a lower initial zeta potential that decreases more rapidly, with an isoelectric point around pH 4. The shift in PPIA+ is due to the salt interaction from SHMP, which affects the protein's electrostatic properties and reduces its stability, making it more prone to aggregation and precipitation at lower pH levels. The higher zeta potential values for PPI140 suggest better solubility and dispersion in applications, while PPIA+ may aggregate or precipitate more readily at lower pH levels.

Figure 8:
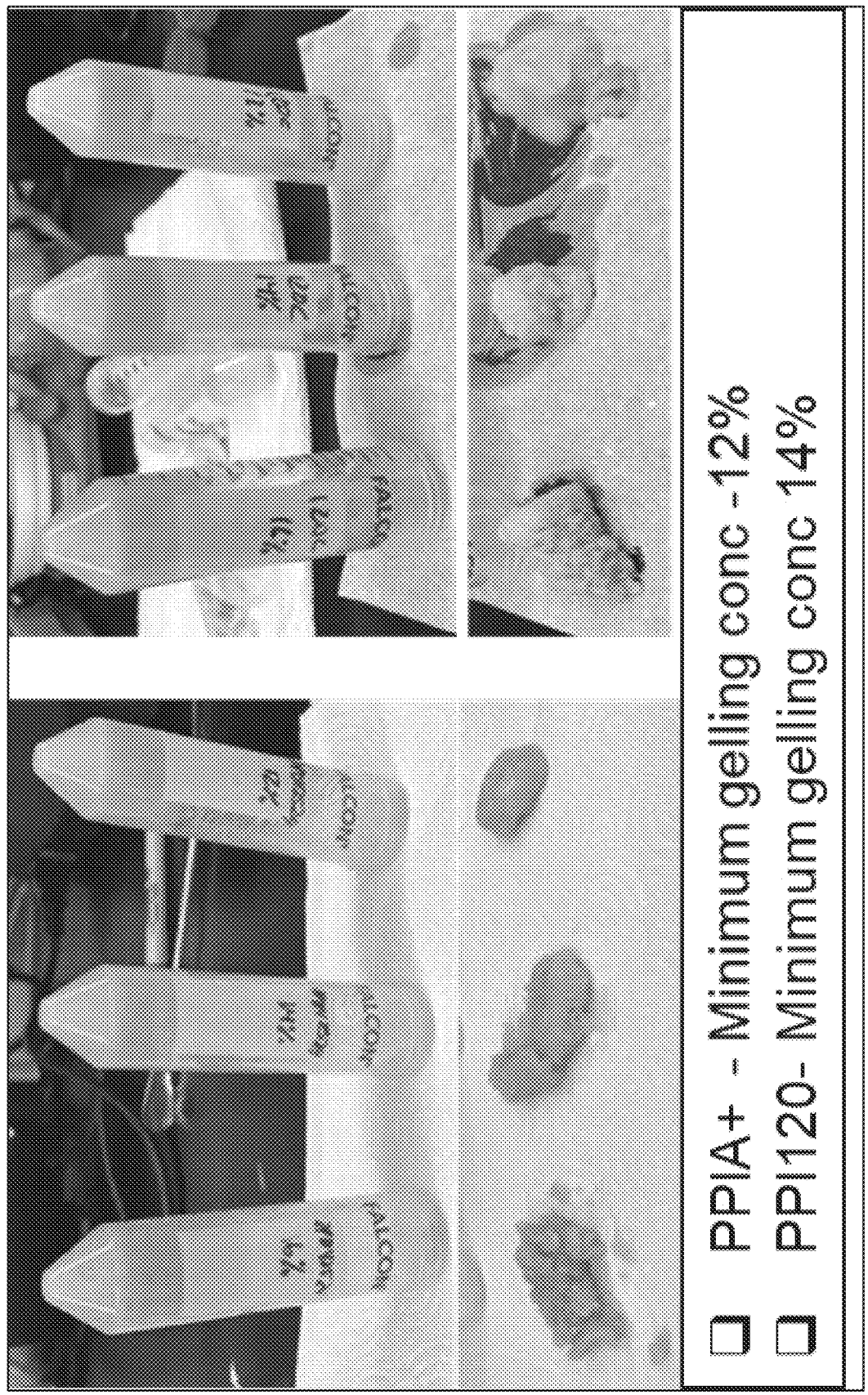
FIG. 8 shows the gelling characteristics of albumin enriched PPI.

FIG. 8 shows the solubility of a pea protein isolate across a range of pH values, comparing the solubility at room temperature (RT) and after heating. At lower pH levels (3 to 4.5), the solubility is minimal for both RT and heated samples, indicating poor solubility in highly acidic conditions. As the pH increases from 5 to 6, there is a significant rise in solubility, reaching nearly 100% at pH 6. This high solubility is maintained across the higher pH range (6 to 8) for both RT and heated samples. The similar solubility profiles for RT and heated samples suggest that the heating process does not significantly affect the protein's solubility across the tested pH range. This behavior highlights the protein's potential suitability for applications in a wide range of food products, where maintaining solubility at different pH levels is crucial.

Figure 9:
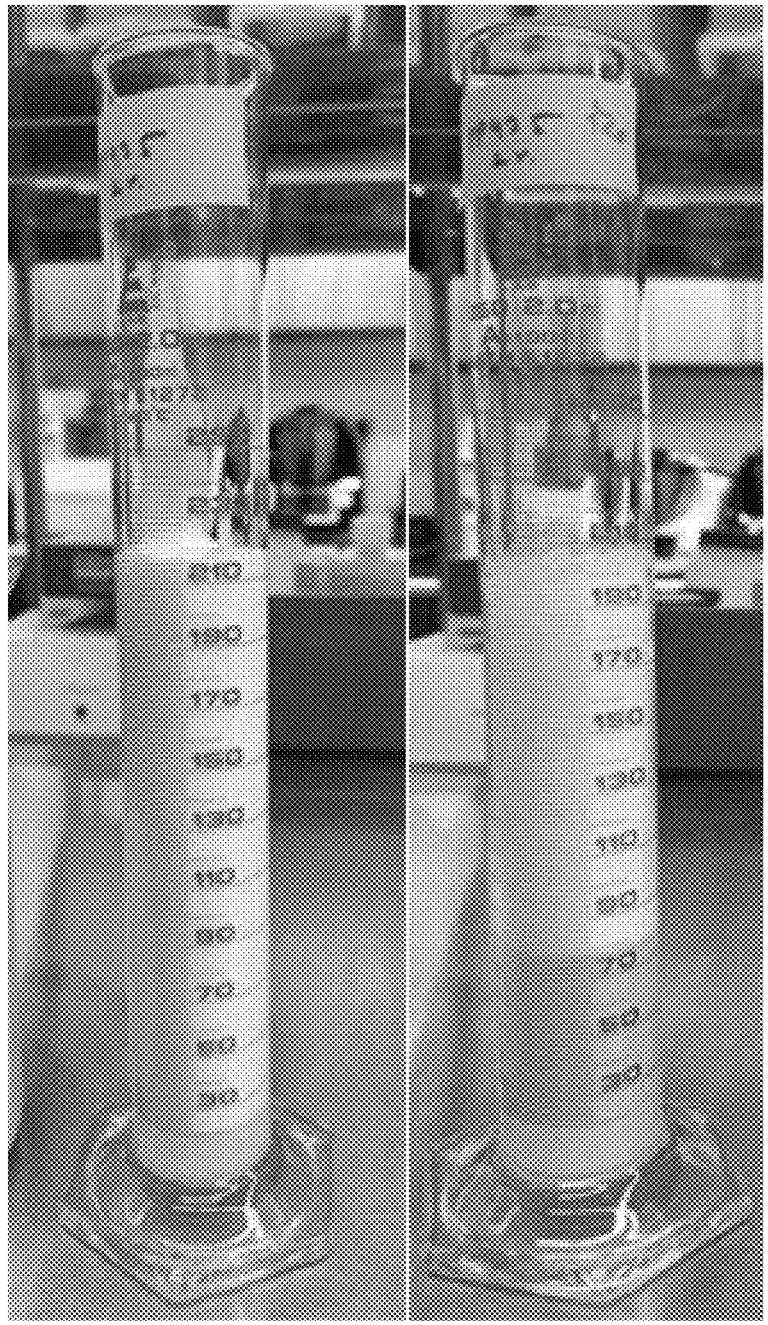
FIG. 9 shows the foaming properties of the albumin enriched PPI.

FIG. 9 shows the gelling characteristics of pea albumin enriched PPI (PPIA+) and pea PPI obtained from conventional processes. Varying concentrations, 12%, 14%, and 16%, of PPIs were added to water to determine the minimum gelling concentration. PPIA+ showed a reduced minimum gelling concentration relative to the conventional PPI.

FIG. 10 shows the foaming properties of the albumin enriched PPI.

What is claimed is:

1. A method of making an albumin enriched pea protein isolate consisting essentially of:
    a) performing a protein extraction of pea flour with an aqueous solution,
        i) at a pH of about 7 to 10,
        ii) at a temperature of about 18° C. to 60° C., and
        iii) for about 30 minutes to 60 minutes for the protein extraction;
    b) separating solids from the aqueous solution in step a) to produce a liquid fraction;
    c) precipitation of protein from the liquid fraction by
        i) precipitating protein at a pH about 4 to 8, at a temperature of about 18° C. to 95° C. for about 5 to 60 minutes, and
        ii) using 0.1% to 5% sodium hexametaphosphate to produce the albumin enriched pea protein isolate.

2. The method of claim 1, wherein the pH of step a) is 8 to 9.5.

3. The method of claim 1, wherein the temperature of step a) is about 50° C. to 60° C.

4. The method of claim 1, wherein step a) is performed for about 30 minutes.

5. The method of claim 1, wherein the pH of step c) is 4 to 7.

6. The method of claim 1, wherein the temperature of step c) is about 50° C. to 60° C.

7. The method of claim 1, wherein step c) is performed for about 30 minutes.

* * * * *